United States Patent [19]

Bjerrum et al.

[11] Patent Number: 5,311,595
[45] Date of Patent: May 10, 1994

[54] METHOD OF TRANSFERRING DATA, BETWEEN COMPUTER SYSTEMS USING ELECTRONIC CARDS

[75] Inventors: Jorgen Bjerrum, Oure; Steen Ottosen, Odense; Nielsen Kjaer, Albertslund, all of Denmark

[73] Assignee: Kommunedata I/S, Copenhagen V, Denmark

[21] Appl. No.: 772,372

[22] PCT Filed: Jun. 7, 1990

[86] PCT No.: PCT/DK90/00141
§ 371 Date: Nov. 5, 1991
§ 102(e) Date: Nov. 5, 1991

[87] PCT Pub. No.: WO90/15490
PCT Pub. Date: Dec. 13, 1990

[30] Foreign Application Priority Data

Jun. 7, 1989 [DK] Denmark .............................. 2790/89

[51] Int. Cl.$^5$ ................................................ H04C 9/12
[52] U.S. Cl. ........................................ 380/25; 380/23
[58] Field of Search ................................. 380/23, 25

[56] References Cited

U.S. PATENT DOCUMENTS

| 4,176,246 | 11/1979 | Gaetzli ........................ 380/23 |
| 4,467,139 | 8/1984 | Mollier ........................ 380/23 |
| 4,549,075 | 10/1985 | Saada et al. ................. 380/23 |
| 4,656,474 | 4/1987 | Mollier et al. .............. 380/23 |
| 4,677,670 | 6/1987 | Henderson, Jr. .......... 380/25 |
| 4,807,288 | 2/1989 | Ugon et al. ................. 380/25 |
| 4,823,388 | 4/1989 | Mizutani et al. ............ 380/25 |
| 4,882,779 | 11/1989 | Rahtgen ...................... 380/25 |
| 4,907,272 | 3/1990 | Hazarb et al. .............. 380/23 |
| 4,910,773 | 3/1990 | Hazard et al. ............. 380/125 |
| 4,926,480 | 3/1990 | Chaum ....................... 380/23 |
| 4,935,962 | 6/1990 | Austin ........................ 380/25 |
| 4,974,193 | 11/1990 | Beutelspacher et al. ... 380/25 |
| 4,989,244 | 1/1991 | Naruse et al. ............... 380/23 |

FOREIGN PATENT DOCUMENTS

| 0114368 | 8/1984 | European Pat. Off. . |
| 0147716 | 7/1985 | European Pat. Off. . |
| 0194839 | 9/1986 | European Pat. Off. . |
| 0277247 | 8/1988 | European Pat. Off. . |
| 0285520 | 10/1988 | European Pat. Off. . |
| 0396894 | 11/1990 | European Pat. Off. . |
| 166541B1 | 3/1991 | European Pat. Off. . |
| 3631797 | 3/1988 | Fed. Rep. of Germany . |
| 2526977 | 6/1988 | France . |
| 1399020 | 6/1975 | United Kingdom . |

OTHER PUBLICATIONS

Smart Credit Cards: the answer to cashless shopping; IEEE Spectrum Feb. 1984, pp. 43-49.

Primary Examiner—Salvatore Cangialosi
Attorney, Agent, or Firm—Merchant & Gould, Smith, Edell, Welter & Schmidt

[57] ABSTRACT

When transferring data, an electronic document or the like from a first computer system (100) to a second computer system (200) via a data transmission line (300), e.g. a public data transmission line, a first output and input station (122) comprising a first electronic card (124) and a second output and input station (222) comprising a second electronic card (224) are used. The data is transferred to the first electronic card (124) from the first computer system (100) via the first station (122) and is encrypted in the first electronic card (124), whereupon the data is output from the first electronic card (124) in encrypted form and transferred via the first station (122) to the first computer system (100) and therefrom to the data transmission line (300). The data is received by the other computer system (200) in encrypted form and is transferred to the second electronic card (224) via the second station (222), whereupon the data is decrypted in the second electronic card (224) and is output from the second electronic card via the second station (222) to the second computer system (200). As the data transfer between the first and the second computer system is carried out between the first and the second electronic card, no third parties have neither authorized or unauthorized possibility of interfering with the data transmission and possibly changing the data or the electronic document. The first and second electronic card (124, 224) constitute a coherent set of cards comprising coherent encryption/decryption keys input into the internal storages of the cards.

33 Claims, 4 Drawing Sheets

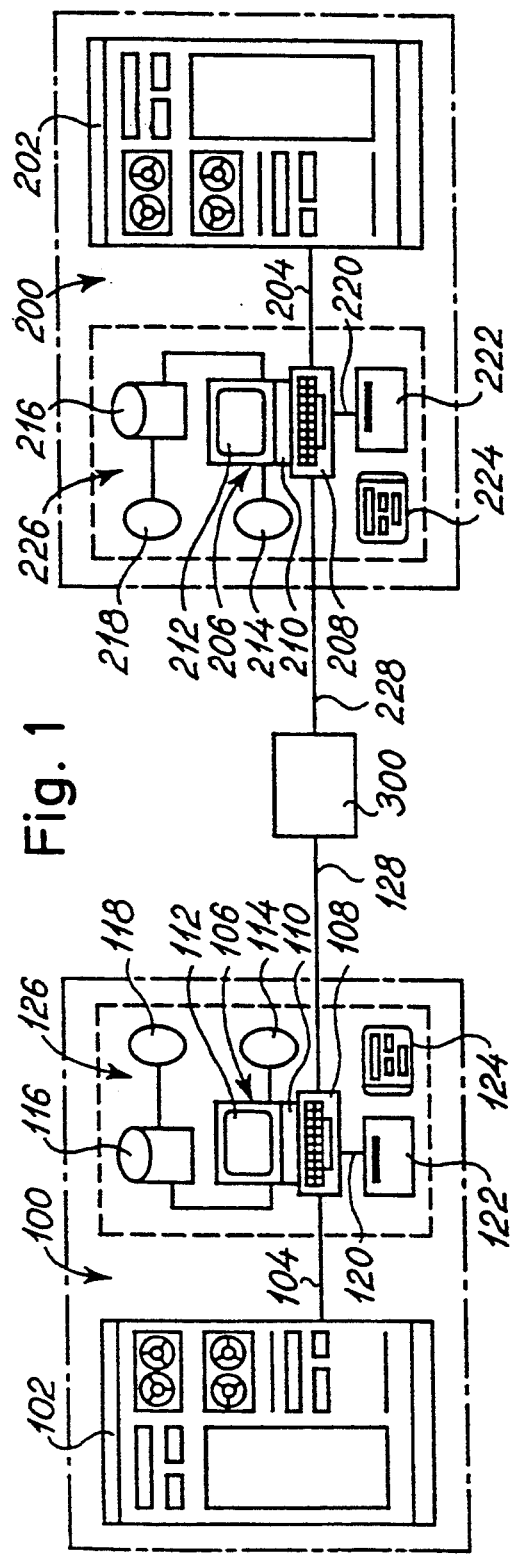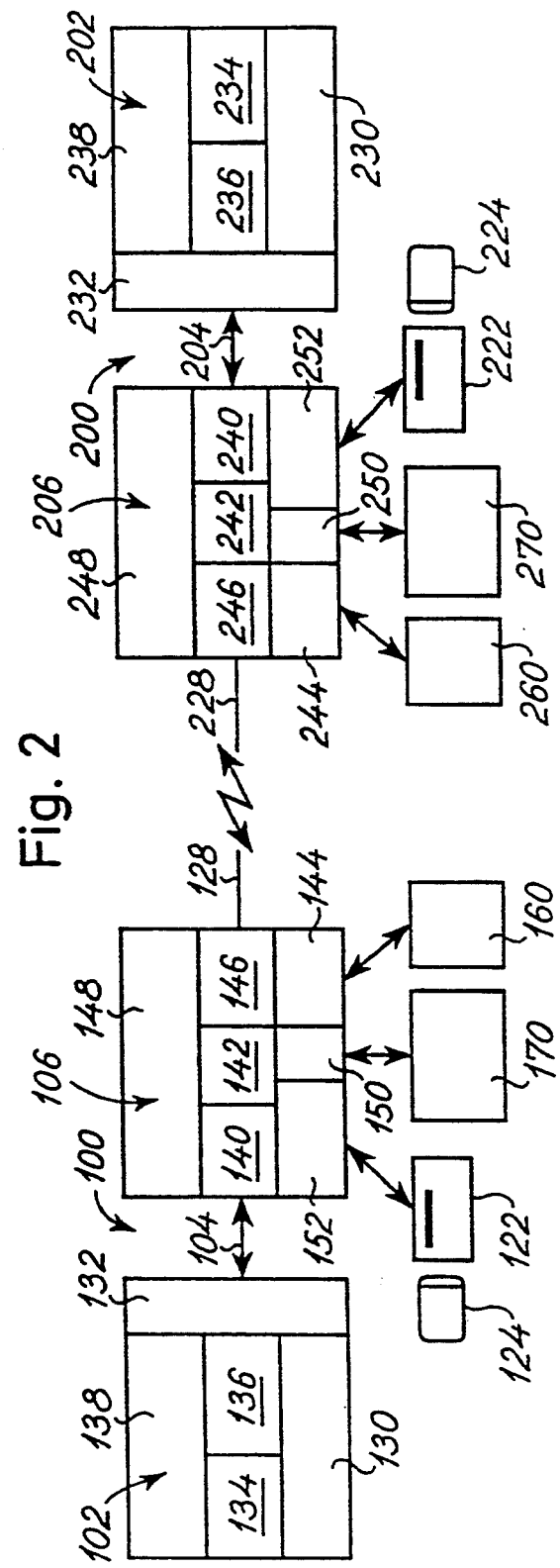

METHOD OF TRANSFERRING DATA, BETWEEN COMPUTER SYSTEMS USING ELECTRONIC CARDS

The present invention relates to a method of transferring data, an electronic document or the like from a first computer system to a second computer system via a data transmission line, e.g. a public data transmission line.

Several techniques and standards are known for transferring data, electronic documents or the like from a first computer system to a second computer system via different data transmission lines such as high speed communication lines, private or public data transmission lines, etc. If the data transmission line itself is not secured against third parties with or without authorization being able to tap the data transferred via the data transmission line or the electronic document transferred via the data transmission line, it is a conventional technique to provide an encryption of the data or the electronic document in accordance with encryption/decryption techniques well-known per se, which techniques may comprise either symmetrical or asymmetrical encryption algorithms, secret or public keys. In this context reference is only to be made to the well-known DES algorithm (Data Encryption Standard), developed by IBM in cooperation with the National Bureau of Standards (NBS), USA. As an example of a data/document exchange protocol mention is here to be made of the data/document exchange protocol —LECAM— developed by FRANCE TELECOM in connection with the Minitel computers used widely in France, in accordance with which the data/document transfer may take place in encrypted and not encrypted form (further specifications of the protocol are given in S.T.U.C.A.M-Spécification Techniques d'Utilisation du LECAM, ©Décembre 1987, FRANCE TELECOM, Télétel). Such an encrypted data transmission presupposes, however, that the transmitter and the receiver can agree to establishing a mutual set of encryption/decryption keys, as the parties involved, transmitter and receiver, invariably have to reveal details concerning security levels, etc. Such an agreement requires, however, that both transmitter and receiver fully trust the other party. Even if the two parties, who are to make a transfer of data or a transfer of one electronic document from a first computer system to a second computer system, can agree to such an exchange of encryption/decryption keys for use in connection with an encryption/decryption algorithm agreed upon, not even such an encrypted data transmission ensures that the data sent from the first computer system or the electronic document sent from the first computer system is received correctly by the second computer system, as it will be possible to manipulate the data or the electronic document in connection with the execution of the encryption algorithm in the first computer system, just as the receiver after decryption can manipulate the data or the electronic document. Such an encrypted data transmission does not in itself ensure that the transfer taking place is the intended or desired transfer of the data or the electronic document, that the data received by the second computer system or the electronic document received by the second computer system, in the form in which the data or the electronic document exists in the second computer system after transfer, is identical to the data sent from the first computer system or the electronic document sent from the first computer system. Such an encrypted data transmission via a public or private data transmission line does neither in itself ensure that the two computer systems communicating with each other are the correct, intended parties of communication.

The object of the present invention is to provide a method of the type defined above, according to which method it is possible to establish immediately a secure data or document transfer between two computer systems without having to exchange encryption/decryption keys between the computer systems, reveal details concerning security levels, etc., and according to which method it is ensured that the desired data or document transfer actually takes place, as it is ensured that it will not be possible for either of the parties or for a third party to interfere with the data or document transfer. The object of the present invention is thus more explicitly to provide techniques ensuring that at the transfer of data or an electronic document from one first computer system to a second computer system via a data transmission line, e.g. a public data transmission line, it is guaranteed that the data received by the second computer system or the electronic document received by the second computer system is identical to the data sent from the first computer system or the electronic document sent from the first computer system and vice versa.

This object is obtained in accordance with the invention by means of a method of the type defined above, which method in accordance with a first aspect of the invention is characterized in that for said transfer
- a first station is used for outputting data from and inputting data into a first electronic card, said first station being connected to and communicating with said first computer system and furthermore being connected to said data transmission line via said first computer system and interfacing means, and
- a second station is used for outputting data from and inputting data into a second electronic card, said second station being connected to and communicating with said second computer system and furthermore being connected to said data transmission line via this second computer system and interfacing means,
- said first and second electronic card each comprising a central data processing unit, an internal storage means, an input/output gate for communication with said corresponding station as well as an encryption/decryption means and together constituting a coherent set of cards comprising coherent encryption and decryption keys input into said internal storages of said cards,
- said data or said electronic document being transferred to said first electronic card from said first computer system via said first station and said input/output gate of said first electronic card, being input into and being temporarily stored in said internal storage of said first electronic card,
- said data or said electronic document being output from said internal storage of said first electronic card and being encrypted in said first electronic card by means of said encryption/decryption means of said first electronic card and said encryption key(s) stored in said internal storage of said first electronic card, said data or said electronic document being output from said first electronic card in encrypted form via said input/output gate of said first electronic card and being transferred via said first station to said first computer system and being transferred therefrom via said interfacing means of said first computer system to said data transmission line, said data or said electronic document being received by said second computer system in encrypted form via said interfacing means of said second computer system, being transferred to said second electronic card via said second station and via said input/output gate of said second electronic card, being input into and temporarily stored in said internal storage of said second electronic card, said data or said electronic document being output from said internal storage of said first electronic card in encrypted form and being decrypted in said second electronic card by means of said encryption/decryption means of said second electronic card and said decryption key(s) stored in said internal storage of said second electronic card, and said data or said electronic document being output after decryption in said second electronic card from said second electronic card and output to said second computer system via said input/output gate of said second electronic card and via said second station.

In accordance with the first aspect of the invention, the data or document transfer from the first computer system to the second computer system is established by means of two coherent electronic cards, which by themselves ensure the necessary data transmission security during data transmission in encrypted form, as the use of two coherent electronic cards at the same time relative to both transmitter and receiver, guarantees that the data output from the second electronic card or the electronic document output from the second electronic card is identical to the data input into the first electronic card or the electronic document input into the first electronic card.

As the data transfer between the first and the second computer system is carried out between the first and the second electronic card, no third parties with or without authorization are able to interfere with the data transmission and change the data or the electronic document. As will be clear, this data or document transfer in accordance with the teaching of the invention is possible, without having to make any other modification in the connection between the first and the second computer system than the supplementing (which is characteristic to the invention) of both the first and the second computer system with associated input and output stations, which are used for input and output of data in the respective electronic cards belonging to the coherent set of cards. Such coherent set of cards can be issued immediately, hired out or sold by a neutral and outside card issuer, who thus without neither transmitter or receiver having to provide information about data transmission secrets such as encryption algorithms, security levels, etc., can enable the transmitter and the receiver to transfer data or electronic documents between the corresponding computer systems without any risk that the data received by the receiver or the electronic document received by the receiver is not identical to the data sent by the transmitter or the electronic document sent by the transmitter.

In accordance with the present invention it is furthermore possible to ensure that the transfer takes place between computer systems, the authenticity of which is verified relative to one another, as a verification of the authenticity of the first electronic card relative to the second electronic card and vice versa is preferably made prior to the transfer of the data or the electronic document from the first computer system to the second computer system.

In accordance with the method according to the invention it is furthermore possible to verify that the data or document transfer is correct, i.e. to verify that the data received by the receiver or the second computer system or the electronic document received by the receiver or the second computer system is identical to the data sent from the first computer system or the electronic document sent from the first computer system, as in accordance with the invention a verification of the integrity of the data or document transfer is preferably made at the transfer of the data or the electronic document from the first computer system to the second computer system.

The utilization of a coherent set of electronic cards which is characteristic of the invention, via which the data and document transfer takes place, makes it possible for the data or document transfer to proceed completely autonomously without any possibility of interference or corrupting from neither the computer systems involved, persons, including operators, who with or without authorization try to change the data or the electronic document being transferred, as in accordance with the method of the invention, the inputting into, the outputting from, the encryption and the decryption and possibly the authenticity and integrity verification are preferably controlled autonomously by the central data processing unit of the individual card.

In accordance with a special aspect of the present invention, the actual transfer of the data or the electronic document between the first and the second computer system is preferably made in accordance with the above-mentioned LECAM protocol either in encrypted or decrypted form.

According to a first embodiment of the above described authenticity verification it is preferred that
a first set of data being generated in said first electronic card, said set of data being input into and stored in said internal storage of said first electronic card and being encrypted in said first electronic card by means of said encryption/decryption means of said first electronic card and said encryption key(s) stored in said internal storage of said first electronic card, said first set of data being output from said first electronic card in encrypted form via said input/output gate of said first electronic card, being transferred via said first station to said first computer system and being transferred therefrom via said interfacing means of said first computer system to said data transmission line, said first set of data being received by said second computer system in encrypted form via said interfacing means of said second computer system, being transferred to said second electronic card via said second station and via said input/output gate of said second electronic card being input into and temporarily stored in said internal storage of said second electronic card, said first set of data received by said second computer system in encrypted form being output from said internal storage of said second electronic card and being decrypted in said second electronic card by means of said encryption/decryption means of said second electronic card and said decryption key(s) stored in said internal storage of said second electronic card.

said first set of data received by said second computer system in encrypted form and decrypted in said second electronic card being input into and stored in said internal storage of said second electronic card, a second set of data being generated in said second electronic card, said second set of data being input into and stored in said internal storage of said second electronic card, a first combination of said first set of data received by said second computer system in encrypted form, decrypted and stored in said internal storage of said second electronic card and said second set of data stored in said internal storage of said second electronic card being generated in said second electronic card, said first combination being input into and stored in said internal storage of said second electronic card, said first combination being encrypted in said second electronic card by means of said encryption/decryption means of said second electronic card and said encryption key(s) stored in said internal storage of said second electronic card, said first combination being output from said second electronic card in encrypted form via said input/output gate of said second electronic card, being transferred via said second station to said second computer system and being transferred therefrom via said interfacing means of said second computer system to said data transmission line, said first combination being received by said first computer system in encrypted form via said interfacing means of said first computer system, being transferred to said first electronic card via said first station and via said input/output gate of said first electronic card, being input into and temporarily stored in said internal storage of said first electronic card, said first combination received by said first computer system in encrypted form being output from said internal storage of said first electronic card and being decrypted in said first electronic card by means of said encryption/decryption means of said first electronic card and said decryption key(s) stored in said internal storage of said first electronic card, said first combination received by said first computer system in encrypted form and decrypted in said first electronic card being input into and stored in said internal storage of said first electronic card, said first combination stored in said internal storage of said first electronic card being decombined for producing a first set of data retransmitted to said first electronic card and a second set of data transferred to said first electronic card, said first set of data retransmitted to said first electronic card and said second set of data transferred to said first electronic card being input into and stored in said internal storage of said first electronic card, said first set of data stored in said internal storage of said first electronic card being compared to said first set of data retransmitted to said first electronic card and stored in said internal storage of said first electronic card for verification of identity between these sets of data for verification of the authenticity of said second electronic card relative to said first electronic card, a third set of data being generated in said first electronic card, said third set of data being input into and stored in said internal storage of said first electronic card, a second combination of said second set of data received in encrypted form by said first computer system, decrypted and stored in said internal storage of said first electronic card and said third set of data stored in said internal storage of said first electronic card being generated in said first electronic card, said second combination being input into and stored in said internal storage of said first electronic card, said second combination being encrypted in said first electronic card by means of said encryption/decryption means of said first electronic card and said encryption key(s) stored in said internal storage of said first electronic card, said second combination being output from said first electronic card in encrypted form via said input/output gate of said first electronic card, being transferred via said first station to said first computer system and being transferred therefrom via said interfacing means of said first computer system to said data transmission line, said second combination being received by said second computer system in encrypted form via said interfacing means of said second computer system, being transferred to said second electronic card via said second station and via said input/output gate of said second electronic card, being input into and temporarily stored in said internal storage of said second electronic card, said second combination received by said second computer system in encrypted form being output from said internal storage of said second electronic card and being decrypted in said second electronic card by means of said encryption/decryption means of said second electronic card and said decryption key(s) stored in said internal storage of said second electronic card, said second combination received by said second computer system in encrypted form and decrypted being input into and stored in said internal storage of said second electronic card, said second combination stored in said internal storage of said second electronic card being decombined for producing a second set of data retransmitted to said second electronic card and third set of data transferred to said second electronic card, said second set of data retransmitted to said second electronic card and said third set of data transferred to said second electronic card being input into and stored in said internal storage of said second electronic card, and said second set of data stored in said internal storage of said second electronic card being compared to second set of data retransmitted to said second electronic card and stored in said internal storage of said second electronic card for verification of identity between these sets of data for verification of the authenticity of said first electronic card relative to said second electronic card.

In this authenticity verification the first, the second and the third set of data serve in a unique and logical way relative to the first and the second electronic card to verify that the transfer of data or the electronic document has taken place correctly and thus that the data or the electronic document which is received by the second electronic card, is identical to the data sent by the first electronic card or the electronic document sent by the first electronic card and further to ensure that the transmitter and the receiver are authorized transmitter and received, respectively, and also that the transmitter and receiver are what they pretend to be.

According to a first embodiment of the invention the integrity verification is made by a compacted version of said data or said electronic document being generated in said first computer system or said first electronic card, said compacted version being input into and stored in said internal storage of said first electronic card, a compacted version of said data transferred to said second computer system or of said electronic document transferred to said second computer system being generated in said second computer system or in said second electronic card, said compacted version being input into and stored in said internal storage of said second electronic card, said compacted version stored in said internal storage of said first electronic card being output from said internal storage of said first electronic card and encrypted in said first electronic card by means of said encryption/decryption means of said first electronic card and said encryption key(s) stored in said internal storage of said first electronic card, said compacted data or document version encrypted by said encryption/decryption means of said first electronic card being output from said first electronic card via said input/output gate of said first electronic card, being transferred via said first station to said first computer system and being transferred therefrom via said interfacing means of said first computer system to said data transmission line, said encrypted and compacted data or document version transferred from said first computer system being received by said second computer system via said interfacing means of said second computer system, being transferred to said second electronic card via said second station and via said input/output gate of said second electronic card, being input into and temporarily stored in said internal storage of said second electronic card, said compacted data or document version received by said second computer system in encrypted form being output from said internal storage of said second electronic card and being decrypted in said second electronic card by means of said encryption/decryption means of said second electronic card and said decryption key(s) stored in said internal storage of said second electronic card, said decrypted, compacted data or document version received by said second computer system in encrypted form and decrypted by said second electronic card being input into and stored in said internal storage of said second electronic card, a comparison of said compacted data or document version stored in said second electronic card and said decrypted, compacted data or document version received by said second computer system in encrypted form and decrypted being made in said second electronic card for verification of the integrity of or identity between said data transferred from said first computer system and said data received by said second computer system or of the integrity of or identity between said electronic document transferred from said first computer system and said electronic document received by said second computer system.

According to a further and alternative embodiment of the invention the integrity verification is made by a compacted version of said data or said electronic document being generated in said first computer system or in said first electronic card, said compacted version being input into and stored in said internal storage of said first electronic card, a compacted version of said data transferred to said second computer system or said electronic document transferred to said second computer system being generated in said second computer system or in said second electronic card, said compacted version being input into and stored in said internal storage of said second electronic card, said compacted version stored in said internal storage of said second electronic card being output from said internal storage of said second electronic card and encrypted in said second electronic card by means of said encryption/decryption means of said second electronic card or said encryption key(s) stored in said internal storage of said second electronic card, said compacted data or document version encrypted by said encryption/decryption means of said second electronic card being output from said second electronic card via said input/output gate of said second electronic card, being transferred via said second station to said second computer system and being transferred therefrom via said interfacing means of said second computer system to said data transmission line, said encrypted and compacted data or document version transferred from said second computer system being received by said first computer system via said interfacing means of said first computer system, being transferred to said first electronic card via said first station and via said input/output gate of said first electronic card, being input into and temporarily stored in said internal storage of said first electronic card, said compacted data or document version received by said first computer system in encrypted form being output from said internal storage of said first electronic card and being decrypted in said first electronic card by means of said encryption/decryption means of said first electronic card and said decryption key(s) stored in said internal storage of said first electronic card, said decrypted, compacted data or document version received by said first computer system in encrypted form and decrypted by said first electronic card being input into and stored in said internal storage of said first electronic card, a comparison of said compacted data or document version stored in said first electronic card and said decrypted, compacted data or document version received by said first computer system in encrypted form and decrypted being made in said first electronic card for verification of the integrity of or identity between said data transferred from said first computer system and said data received by said second computer system or of the integrity of or identity between said electronic document transferred from said first computer system and said electronic document received by said second computer system.

In accordance with the presently preferred embodiment, the integrity verification is, however, made by transferring a compacted data or document version from the first electronic card to the second electronic card as well as from the second electronic card to the first electronic card and comparing both transferred, compacted data or document versions to stored, compacted data or document versions in the two electronic cards.

According to alternative embodiments of the method according to the invention, said alternative embodiments constituting combinations of the authenticity and integrity verifications, said transfer of said compacted data or document version generated in said first computer system or in said first electronic card from said first electronic card to said second electronic card is made simultaneously with said transfer of said data or said electronic document itself, said data or electronic document and said compacted data or document version being combined and encrypted as a whole before said transfer, or alternatively said transfer of said compacted data or document version generated in said second computer system or in said second electronic card from said second electronic card to said first electronic card is made simultaneously with a retransmission of said data or said electronic document received from said first electronic card from said second electronic card to said first electronic card, said data or electronic document to be retransmitted and said compacted data or document version being combined and encrypted as a whole before said transfer.

According to a combination of these alternative integrity and authenticity verifications, a simultaneous retransmission of said compacted data or document version received by said second electronic card and generated in said first computer system or in said first electronic card is made at said transfer of said compacted data or document version generated in said second computer system or in said second electronic card and said retransmission of said data or said electronic document from said second electronic card, both compacted data or document versions and said data or said electronic document to be retransmitted being combined and encrypted as a whole before said transfer.

The above stated objects are alternatively obtained in accordance with the invention by a method of the type defined above, which method in accordance with a second aspect of the invention is characterized in that for said transfer a first station is used, which is secured against illegal entry, i.e. a so-called "tamper-proof" station, for outputting data from and inputting data into a first card, said first station being connected to and communicating with said first computer system and furthermore being connected to said data transmission line via said first computer system and interfacing means, and said first station having a central processing unit, an internal storage, an input/output means for outputting data from and inputting data into said first card as well as an encryption/decryption means, and a second station is used, which is secured against illegal entry, i.e. a so-called "tamper-proof" station, for outputting data from and inputting data into a second card, said second station being connected to and communicating with said second computer system and furthermore being connected to said data transmission line via said second computer system and interfacing means, and said second station having a central data processing unit, an internal storage, an input/output means for outputting data from and inputting data into said first card as well as an encryption/decryption means said first and second card constituting a coherent set of cards comprising coherent data input into said cards concerning said coherent encryption/decryption keys stored in said internal storages of said corresponding stations, said data or said electronic document being transferred to said first station and being input into and temporarily stored in said internal storage of said first station, said data or said electronic document being output from said internal storage of said first station and being encrypted in said first station by means of said encryption/decryption means of said first station and said encryption key(s) stored in said internal storage of said first station, said data or said electronic document being output from said first station to said first computer system in encrypted form and therefrom via said interfacing means of said first computer system to said data transmission line, said data or said electronic document being received by said second computer system in encrypted form via said interfacing means of said second computer system, being transferred to said second station, being input into and temporarily stored in said internal storage of said second station, said data or said electronic document received in encrypted form being decrypted in said second station by means of said encryption/decryption means of said second station and said decryption key(s) stored in said internal storage of said second station, and said data or said electronic document in said second station being output from said second station after decryption to said second computer system.

This alternative method according to the second aspect of the invention is preferably in accordance with advantageous embodiments of the method implemented in accordance with the above stated embodiments of the method according to the first aspect of the present invention.

The present invention furthermore relates to a system for transferring data, an electronic document or the like from a first computer system to a second computer system, said second computer system being autonomous in relation to said first computer system, via a data transmission line, e.g. a public data transmission line, in accordance with the method according to the first aspect of the invention, which system in accordance with the invention is characterized in that it comprises the first station and the second station, which are connected to and communicate with the first and the second computer system, respectively, and which furthermore via the first and the second computer system, respectively, and the corresponding interfacing means are connected to the data transmission line, as well as the first and the second electronic card, which constitute a coherent set of cards comprising the coherent encryption/decryption keys input into the internal storages of the cards. The coherent set of cards used in this system according to the invention preferably comprises cards of the type DES Smart Card (Philips), Super Smart Card (Bull) or CP8 Smart Card (Bull) or at least a card implemented on a printed circuit card, a thick-film substrate, a thin-film module, etc.

The present invention furthermore relates to a system for transferring data, an electronic document or the like from a first computer system to a second computer system, said second computer system being autonomous relative to said first computer system, via a data transmission line, e.g. a public data transmission line, said system being characterized in that it comprises said first station and said second station, which are connected to and communicate with said first and said second computer system, respectively, and which furthermore via said first and said second computer system, respectively, and corresponding interfacing means are connected to said data transmission line, as well as said first and said second card, which constitute a coherent set of cards comprising said coherent data input into said cards concerning said coherent encryption/decryption keys stored in said internal storages of said corresponding stations. The coherent set of data, which is used according to the system and the method according to the second aspect of the invention can be a magnetic card as well as an electronic card which again can be of above-mentioned type. In accordance with this aspect of the invention, any other medium can furthermore be used.

The present invention furthermore relates to an electronic card comprising a central data processing unit, an internal storage, an input/output gate for communication with a associated station for outputting data from and inputting data into the electronic card as well as an encryption/decryption means, which card according to the invention constituting a first electronic card of a coherent set of cards comprising the first electronic card and a second electronic card, which electronic cards have coherent encryption/decryption keys and are designed to be used in accordance with a method according to the first aspect of the invention.

The encryption made according to the invention can be made according to arbitrary known technique and comprise symmetrical or asymmetrical encryption/decryption algorithms such as DES algorithms, RSA algorithms or the like. The encryption/decryption algorithms can furthermore be combined.

The invention will now be further described with reference to the drawing, in which FIG. 1 shows a system according to the invention comprising a first computer system and a second computer system communicating with each other via a data transmission line for carrying out the method according to the invention, FIG. 2 schematically shows the structure of the software of the system shown in FIG. 1, FIG. 3 schematically shows a system according to the invention comprising two computer systems communicating with each other via a data transmission line, and furthermore a mini computer, FIG. 4 schematically shows an enlarged system comprising three computer systems, which according to the teaching of the invention communicate with each other via a data transmission line, and one of which furthermore communicates with two terminals or Minitels via appropriate interfacing means and the data transmission line, FIG. 5 shows a block diagram of an authenticity verification, and FIG. 6 shows a block diagram of an integrity verification.

In FIG. 1, a system according to the invention for carrying out the method according to the invention is shown schematically, which system comprises two autonomous computer systems, a first computer system shown in the left-hand part of FIG. 1 and designated the reference numeral 100 in its entirely, and a second computer system shown in the right-hand part of FIG. 1 and designated the reference numeral 200 in its entirety. The two computer systems 100 and 200 are shown schematically comprising the same types of elements, which for the two computer systems are indicated by the same two last digits of the reference numerals, the reference numerals for elements belonging to the first computer system 100 beginning with the digit 1 and the reference numerals for elements belonging to the second computer system 200 beginning with the digit 2. The two computer systems 100 and 200 thus each comprises an "inhouse" main computer, 102, 202, respectively. These main computers 102 and 202 communicate via data lines 104, 204 with terminals or personal computers (PC's) 106, 206, which each comprises a keyboard 108, 208, a computer section 110, 210 and a computer screen 112, 212. The terminals or the PC's 106, 206 furthermore communicate with the associated diskette stations or optical disc store 114, 214 as well as hard disks 116, 216 with associated back-up diskette stations or optical disc store 118, 218. The terminals or the PC's 106, 206 are furthermore via respective data transmission lines 120, 220 connected to respective stations 122, 222 for input and output of data in respective electronic cards or chip cards, so-called Smart Cards, which are indicated by the reference numerals 124, 224.

Together with the associated peripheral equipment comprising the diskette stations or optical disc store 114, 214, the hard disks 116, 216, the back-up diskette stations or optical disc store 118, 218, the associated stations 122, 222 as well the associated electronic cards 124, 224, the terminals or the PC's 106, 206 are contained in the blocks 126, 226 indicated by dotted lines.

The task or object of the invention is to provide a possibility of transferring data from the first computer system to the second computer system, by which data transfer it is ensured that the data sent is identical to the data intended to be sent, that the data received is identical to the data sent, and preferably furthermore that the transfer only takes place between parties specifically intended to send and receive data, that receipt of the data is acknowledged by the receiver and furthermore that receipt of the receiver's acknowledgement is acknowledged by the sender relative to the receiver. In the following description, the data transfer is meant to take place from the first computer system 100 to the second computer system 200, but it is of course clear that the data transfer can also take place in the opposite direction. According to the invention the data transfer can furthermore consist in an exchange of data between the two computer systems, i.e. comprise a transfer of data from the first computer system 100 to the second computer system 200 and transfer of data from the second computer system 200 to the first computer system 100. Neither of the respective sides of the two computer systems 100 and 200 has any knowledge of security levels, transmission protocols, encryption/decryption algorithms etc. of the other computer system. Via interfacing means contained in the associated terminals or PC's 106, 206 and the associated data transmission lines 128, 228, the two computer systems 100 and 200 are connected to a public data transmission network, which is collectively indicated by the reference numeral 300. Instead of a public data transmission network, e.g. an X25 data network, the data transmission network 300 can be a private network or comprise combinations of public and private computer networks and furthermore via associated modems (modulators/demodulators) be connected to e.g. telephone lines or other signal or transmission lines.

In order to ensure that the above stated requirements for data transfer are met, the data transfer is made by the data to be transferred from the computer system 100 to the computer system 200 first being output from the main computer 102 of the computer system 100 to the terminal or the PC 106 and being transferred to the station 122. From the station 122 the data is transferred to the electronic card 124 via the input/output gate of this card, whereupon the data is processed exclusively by the electronic card 124. Similar to the card 224, the card 124 has in addition to the above-mentioned input-/output gate, a central processing unit or CPU, an internal storage, an encryption/decryption block which controlled by the internal central processing unit of the card is able to encrypt and decrypt the data by outputting data from the card or by inputting data into the card, respectively, by use of one or more encryption/-decryption keys input into the card in advance, as will be described in greater detail below in a detailed system/software description. For the transfer of data between the cards, the cards 124, 224 have been issued together and constitute a coherent set of cards being preprogrammed as regards encryption/decryption algorithms and keys in such a way that the cards are able to communicate with each other and decrypt data transferred from the first card to the second card and vice versa.

In the electronic card 124, an encryption of the data input is then made, the encrypted data is transferred via the station 122, the data transmission line 120, the terminal or the PC 106, the associated interfacing means and the data transmission line 128 to the data transmission network 300, from which the data via the data transmission line 228, the interfacing means of the terminal or the PC' 206, the terminal or the PC 206, the data transmission line 220 and the station 222 is transferred to the electronic card 224, in which the data is decrypted by means of the encryption/decryption key(s) stored in the card corresponding to the encryption/decryption keys of the card 124. After decryption of the data in the card 224 the data can be output in clear text from the electronic card 224 to the station 222 and be transferred via the data transmission line 220, the terminal or the PC 206 and the data transmission line 204 to the main computer 202. As the data transfer from the first computer system 100 to the second computer system 200 only takes place between the two electronic cards 124 and 224 it is ensured that the data version output from the electronic card 224 is identical to the data version input into the electronic card 124. Hereby it is ensured that the data transferred to the second computer system 200 is identical to data intended to be sent from the first computer system 100, and seen from the point of view of the first computer 100 it is also ensured that the data version which the computer system 200 has received is identical to the data which was initially sent from the first computer system 100.

In the below system description it will furthermore be explained how an authenticity verification between the two electronic cards 124, 224 is made prior to the actual transfer and furthermore how acknowledgements containing compacted data versions are signed for integrity verification, which acknowledgements are transferred between receiver and sender, i.e. between the card 224 and the card 124.

In FIG. 2 the software design of the main computers 102, 202 of the computer systems 100 and 200 and the terminals or PC's 106, 206 is shown schematically. It is to be realized that the software design is only intended to be illustrative and explanatory and in no way to be construed limiting the scope as defined in the appended claims. Each main software comprises an "inhouse" software 130, 230, a communications protocol 132, 232 for transfer of data to the associated terminal or PC 106, 206 via the data transmission lines 104, 204 (e.g. an asynchronous RS 232 communications protocol), two software converter or compiler blocks 134, 234 and 136, 236 for conversion or compiling from "inhouse" format to the transmission protocol determined by the block 132, 232 and from the transmission protocol determined by the block 132, 232 to "inhouse" format, respectively. The main computer software 102, 202 may further comprise a further block 138, 238, a so-called Edifact software, which will be described below.

The terminals or the PC's 106, 206 contain the following software blocks: a communications protocol 140, 240 for communication with the main computer 102, 202 via the data transmission line 104, 204, an internal central software 142, 242 controlling the functions of the terminal or the PC in question, a converter or compiler software 144, 244 corresponding to the software block 138, 238 of the main computer 102, 202, a communications protocol 146, 246, e.g. an X25 protocol, which protocols constitute the interfacing means of the terminal or the PC to the associated data transmission line 128, 228, a software block 148, 248 for communication with the associated peripheral equipment of the terminals or the PC's such as the diskette stations and hard disks 114, 214 and 116, 216 shown in FIG. 1, a software block 150, 250 containing information regarding e.g. "black lists" etc. and finally a software block 152, 252 for communication with the associated station 122, 222. The PC program may further comprise a block corresponding to the blocks 138 and 238 discussed above and comprising Edifact software.

It is to be noted that the data transfer comprising authenticity/integrity verification etc., which is characteristic of the invention, can be implemented with an integrated circuit card constituting a combination of a station and an electronic card such as a combination of the station 122 and the card 124 or of the station 222 and the card 224. Such printed circuit cards are shown in the lower part of FIG. 2 and designated the reference numerals 160 and 260, respectively. The printed circuit card 160, 260 thus constitutes a complementary card relative to the second printed circuit card or relative to an electronic card for use in connection with an associated station. Thus the printed circuit card 160 can be a circuit card complementary to the printed circuit card 260 or a card complementary to the electronic card 224. Correspondingly the printed circuit card 260 can be a card complementary to the electronic card 124 or a card complementary to the printer circuit card 160.

In a further alternative embodiment of the invention the above described data transfer from the electronic card 124 to the electronic card 224 can be established between corresponding security modules 170, 270, which are shown in the lower part of FIG. 2. These security modules or security terminals constitute so-called "tamper-proof" stations, i.e. stations which due to their special physical design make it impossible to open the system and thus reveal material as well as software. Similar to the electronic cards 124, 224, these security modules contain an input/output gate, a central processing unit, internal storages and encryption/decryption blocks. In contrast to the electronic cards 124, 224 and the printed circuit cards 160, 260 integrating stations and cards, the internal storages of the security modules can contain more encryption/decryption keys, which are addressed to a given data transfer by means of a card, e.g. an electronic card or a magnetic card, which similar to the electronic cards 124, 224 and printer circuit card 160, 260 integrating stations and electronic cards are issued by a card issuer, who corresponding to the electronic card or magnetic card in question issues a corresponding magnetic card or an electronic card or a printed circuit card for use at data transfer from a security module addressed by the magnetic card in question to a security module addressed by an associated electronic card and finally to a printed circuit card or vice versa.

In FIG. 3, a system which is enlarged as compared to the system shown in FIG. 1 is shown schematically, and which in addition to the two computer systems 100 and 200 comprises a mini computer which is designated the reference numeral 306 in its entirety and has a keyboard 308, a central processing unit 310 and a computer screen 312. The mini computer system 306 can furthermore comprise peripheral equipment such as a diskette station or a tape station, a printer, etc. Such peripheral equipment is not shown in FIG. 3. For transfer of data to one of the computer systems 100 or 200 or for reception of data from one of these computer systems in accordance with the teaching of the invention, the mini computer system 306 is connected to a station 322, corresponding to the stations 122, 222 shown in FIGS. 1, 2 and 3, via a data transmission line 320 corresponding to the data transmission lines 120 and 220 shown in FIG. 1. Via a data transmission line 328 corresponding to the data transmission lines 128, 228 via an interfacing means contained in the central data processing unit 310 of the mini computer system and furthermore possibly via a modem, which is not shown in FIG. 3, the mini computer system 306 is connected to a public telephone network 330. The public telephone network 330 is via a modem, which is neither shown in FIG. 3, and a data transmission line 332 connected to a converter 346 containing converter or compiler sub-blocks 334, 336 corresponding to the software blocks 134, 234 and 136, 236 shown in FIG. 2 and which via a data transmission line 338 is connected to the network 300.

By means of two coherent cards one of which is received in the station 322, and another one of which is received in the station 122 or 222 of the computer 100 or 200 respectively, it is possible in accordance with the teaching of the invention possible to transfer data to and from the mini computer system 306 from and to the computer system in question, respectively, the associated card station of which computer system has received an electronic card, not shown, corresponding to the electronic card received in the card station 322. Similar to the mini computer system 306, the computer system with which the mini computer is communicating can have its electronic card integrated with the corresponding station in a printed circuit card, similar to the printed circuit cards shown in FIG. 2 and designated the reference numerals 160, 260 belonging to the computer systems 100, 200, or have a security module or security terminal which is addressable by means of an electronic card or a magnetic card as explained above.

In FIG. 4 an alternative computer system configuration is shown which in addition to the above described computer system comprising the first computer system 100 and the second computer system 200 which are interconnected via the network 300, includes a number of mini computer systems, in the present case two mini computer systems 406 which are preferably so-called Minitel computers, communicating with an associated host which is shown in the upper central part of FIG. 4 and designated the reference numeral 400 in its entirety, and which constitutes a computer system. The mini computer systems 406 and the host 400 constitute a so-called videotex system which will be explained in greater detail below in the system/software description. The communication between the Minitel computers 406 and the host 400 is preferably made in accordance with the LECAM protocol developed by FRANCE TELECOM. The computer system 400 constitutes a computer system corresponding to one of the computer system 100, 200, and between the computer system 400 and one of the computer systems 100, 200 data can be transferred both ways in the above described manner by means of two coherent cards, especially two coherent electronic cards. Thus the computer system 400 is basically of a structure equivalent to the structure of the computer systems 100, 200 and comprises a central processing unit 402, which is connected to a communications block 426 corresponding to the blocks 126, 226 via a data transmission line 404, which block 426 is connected to the network 300 via a data transmission line 428 corresponding to the data transmission lines 128, 228. The computer system 400 furthermore comprises a hard disk 460 or disc store, a computer screen 462 and a card reader 464. The card reader 464 is adopted to receive an electronic card of the above described kind, especially a so-called smart card, at transfer of data to and from the Minitel computer 406, as will be explained in greater detail below in the system/software description. The card reader or the station 464 on the other hand has no connection to the external computer systems 100, 200, as the data transfer between the computer system 400 and one of the computer systems 100, 200 is controlled by the communication block 426 in the above described way. The individual Minitel computers 406 has a keyboard 408, a computer screen 412 and a card reader 422, which like the card reader 464 is adopted to receive an electronic card, which makes it possible to transfer data to and from the Minitel computer 406 from and to the computer system 400, respectively. The connection from the individual Minitel computer 406 to the computer system 400 is established via a data transmission line 428 connecting the individual Minitel computer 406 to a public telephone network 430 by means of appropriate modem units, a connection from the public telephone network 430 to the computer system 400 being established via a first data transmission line 432, a converter or compiler 446 and a second data transmission line 438.

The Minitel computers shown in FIG. 4 first of all serve the purpose of distributing electronic document "mail" internally within the Minitel system belonging to the computer system 400, as data or document transfer is made from the individual Minitel computer 406 via the public telephone network 430 and the network 300 by means of an electronic card issued by the institution which runs the computer system 400 to the station 464 of the computer system 400. The computer system shown in FIG. 4 furthermore provides the possibility of transferring data or documents from the individual Minitel computer 406 to the computer system 400, from which system data or documents can be transferred again to a second computer system, e.g. the computer system 100 or the computer system 200 via the data transfer block 426 with associated electronic cards, in accordance with the above described data transfer.

EXAMPLE

A computer system of the type shown in FIGS. 1 and 2 was implemented with:
Personal Computer:
At 10 MHz with 640 kbytes storage,
40 Mbyte hard disk, 2 serial RS232 gates, Danish keyboard, black/white screen including adapter.
Type: Philips P3204.
The following software was used:
MS-DOS operating system version 3.3.
Type: Microsoft
RTOS Real Time Operating System version 4.00.
Type: Dansk Informations Teknologi
X.25 Communication card—16 gates:
Type: Stollmann SICC-PC-X25.
SmartCard reader with power supply and RS232 interface cable:
Type: Philips/Control Data Laserdrive 510 DT
For this system implementation, software was used developed by Net-plus (©1989). The software is developed in C, Pascal and Assembler.

In the computer system, data and documents in encrypted and not encrypted form were furthermore exchanged between a Minitel terminal of the type shown in FIG. 4 with the reference numeral 406 and a computer system of the above described type in accordance with the principles of the invention by means of the LECAM protocol developed by FRANCE TELECOM (©December 1987— FRANCE TELECOM—TELETEL).

A detailed system and software specification will be described below concerning both data transfer from the first computer system to the second computer system, e.g. from the computer system 100 to the computer system 200, and data transfer to and from a Minitel computer 406 to and from the computer system 400, respectively.

System and software description:

The system has an interface to a large surrounding world, which is not under control under all circumstances. This implies that it must be ensured that unauthorized persons do not get unauthorized access to or insight into the system. Below, the security of the system is described and the requirements which are furthermore made to the system, so that this can be of practical use.

There are security systems which are impossible to break, but which are useless in practice, but also security systems which are commercially available and appear to be of practical use, but which unfortunately are also easy to break.

A number of security requirements which the system fulfils will be described now:
1. Large key room
2. No real or statistical possibility of finding a key on the basis of clear text and crypto text
3. No clear text in crypto text
4. Stratified structure of the transmission network Re 1. The number of keys must be so large that it is not practically possible to find the right key by exhaustive search. It must be required that two different keys encrypt the same clear text into different crypto texts. Exactly how large the key room must be, naturally also depends on the resources which are available to a potential "enemy". For the transactions mentioned in this system, 56 bits as in DES are sufficient, as it on average will take at least 4 months to decipher a crypto text with the fastest available computer power. As a new key is used for each transmission, it will be practically impossible to obtain full insight.

Re 2. Even though many coherent clear text messages and corresponding crypto text messages are known, it must not be possible to determine the applied key on the basis of this.

Re 3. In the crypto text there must be no statistical significant trace of the clear text. If there is no such trace, the "enemy's" only weapon is exhaustive search, if only the crypto text is available.

Re 4. The interface specifications for the transmission network via which the encrypted data or text has to be transmitted, normally also prescribe transmission of operational control information which should of course not be encrypted similar to address fields and the like for the data mentioned. Problems may arise, if the interfacing means does not have a stratified structure or if it is not quite clear at which level the encryption is to take place.

Use of chip cards and the DES algorithm provides a solution in which 1. the size of the key room is sufficient, especially as different keys are used for different transfers, and the key for exchange of encryption key is safely hidden in the chip card, 2. it has no practical value to find a key on the basis of both clear text and crypto text, as this key is only used for one transmission, and 3. DES encryption of the documents ensures that there is no clear text in the crypto texts.

When using chip card and DES algorithm in this way, the public X.25 network as well as a teletel videotex network are used. Both these networks facilitate a transparent transfer of encrypted text. There are various protocols for transfer, which are followed in connection with the document transfer. For the videotex network, the LECAM protocol is used.

Symmetrical/asymmetrical systems

Wherever possible, simple methods are used for securing data, however, without reducing the security. Accordingly a symmetrical system (e.g. DES) is preferred to an asymmetrical system (e.g. RSA), as an asymmetrical system, such as RSA requires far more computer power than a symmetrical system, such as DES. A symmetrical system, such as DES, on the other hand, requires greater security concerning keys. (Concerning DES and RSA see above).

1. Symmetrical crypto systems
2. Asymmetrical crypto systems
3. Speeds

Re 1. A symmetrical crypto system is characterized in that the same key is used for encryption and decryption. A much used and safe algorithm for this use is the DES algorithm.

The DES algorithm (Data Encryption Standard) was developed by IBM in cooperation with the National Bureau of Standards NBS) and published in 1977. DES is only used for civilian encryption and is today the most widespread crypto system. In particular, DES is very much used within the banking world, also in the "DANKORT"-system.

In the DES algorithm, encryption is made in blocks of 64 bits by means of a key of 56 bits. First, the 64 bits to be encrypted are subjected to a permutation, which serves to mix the bits, as input in the typical application consists of 8 bytes. Following this, 16 iterated encryptions are made by means of various keys, derived from the chosen key and the clear text, as the 64 bits before each iteration have been divided into a left-hand side Li and a right-hand side Ri, each consisting of 32 bits. In the i+1st iteration Ri is transferred as the next left-hand side Li+1, and the new right-hand side Ri+1 is produced as XOR of Li and 32 other bits, which appears as a complex, but completely described function of Ri and Ki+1, where Ki+1 is a key of 48 bits, which is derived from the chosen key of 56 bits.

The function itself can be described as follows: the 32 bits in Ri are changed to 48 bits by bitshifting and are then permuted. XOR of Ki+1 is generated. The resulting 48 bits are counted 6 at a time in 8 families, which by means of S-boxes are converted to 8 families with only 4 bit in each, so that 32 bits are delivered. After a fixed permutation of these, the above 32 bits are found.

After 16 iterations, the 64 bits are permuted with the inverse permutation of the initial one. This is necessary to ensure that the subsequent decryption of the crypto text can be made by simply performing the DES-algorithm again, but with the 16 derived keys in inverse order.

Re 2. The difference between a symmetrical crypto system and an asymmetrical crypto system is that it is not possible in an asymmetrical system by way of calculation to find the decryption key, even though the encryption key is known, and vice versa.

Instead of "encryption" and "decryption" it is therefore more correct to speak of a secret transformation key SK (Secret Key) and a public transformation key PK (Public Key). In particular, it is required for all messages, X that $$PK(SK(X)) \to X \text{ and } SK(PK(X)) \to X$$

An asymmetrical crypto system can be used for both concealment and authenticity, and even for generation of digital signatures. It must, however, be pointed out that for each individual user A who chooses a key or rather a pair of keys (PA, SA), A can use SA for receipt of secret messages as well as for his own digital signature and other persons' public keys to send concealed messages. In return, other persons can use A's public key to send concealed messages to A.

One of the best known asymmetrical crypto systems is the RSA crypto system (named after the fathers of the system: Rivest, Shamir and Adelman). It is based on experiences which mathematicians have obtained over several thousand years concerning prime numbers. It is relatively easy to decide whether a specific, chosen number n is a prime number or not, but if it turns out that it is not a prime number, the difficulties of finding the prime number divisors increase exponentially with the magnitude of the number. Even when using all the artifices which mathematicians have developed in the course of time, it has not been possible to find a simple way of deducing the prime number divisors. There are extremely many numbers of hundred digits or less (the limit today is about 90), which are practically impossible to resolve into prime factors.

In the RSA crypto system, the origin is two randomly chosen prime numbers p and q of approx. 100 digits each. These prime numbers must be strong prime numbers, which have the effect that it by means of known methods will take billions of years to find the divisors in n on the basis of n=pq (p and q are kept secret). It is necessary that these properties are available because of the security of the system. Then a number e is chosen, which must be prime with (p−1) (q−1). Knowing p and q it is possible to find another number d with the following properties:

Given a random number m less than n, the remainder of $m^d e$ (i.e. m multiplied by itself (d multiplied by e) times) by subsequent division of integers with n, will again give the number m.

It is possible in several ways to divide messages into blocks, which can be represented uniquely as numbers between 1 and n, e.g. by means of ASCII codes. A clear text m, represented in this way, is thereafter encrypted as $$c = m^e \text{ modulus n,}$$

i.e. the remainder of m multiplied by itself e times, by subsequent division of integers with n.

Decryption of c is made by calculating $$c^d \text{ modulus n}$$

which according to the above is equal to m.

The pair of numbers (e, n) can, of course, be used to specify a public key, viz. the key $$P(m) = m^e \text{ modulus n,}$$

whereas the pair of numbers (d, n) specifies the secret key $$S(x) = x^d \text{ modulus n,}$$

(it is only d, which must be kept secret, together with p and q).

Hereby a public key system results.

Re 3. An important requirement for crypto systems is often that a certain speed is guaranteed. Hardware equipment where the algorithm is stored in a specially designed chip, operates with far greater speed than software equipment. It may be a question of a factor of hundred or more, depending on the equipment.

As an example it is to be mentioned that DES in software in e.g. equipment with an INTEL 8086 processor and a clock frequency of 4,7 MHz encrypts at a speed of approx. a few thousand bits per second (there is a possibility of considerable variations depending on the implementation).

As regards software implementation of RSA the fastest 32 bit chips today, e.g. MOTOROLA 68030, with a clock frequency of 20 MHz, will produce an RSA block encryption of 512 bits in approx. 4. sec. and a decryption in approx. 1 sec. (by means of a minor mathematical artifice). By means of so-called "digital signal processing" chips, this can be reduced even further, presumably to 1 sec. or less for an encryption.

On the market today "black boxes" are available containing encryption chips, which can make an encryption with a high security level. One of these is a so-called SCP-box which in addition to being a Chip-card reader with keyboard for PIN-code control also comprises a display, a relatively fast CPU, 128 Kb RAM and the DES as well as RSA algorithms. The box is designed in such a way that it destroys itself when it is attempted to gain physical access to the electronics, i.e. it is so-called "tamper-proof" box. It has an encryption capacity of about 40,000 bytes per minute with the DES algorithm. By using this box the ability of the Chip card to store keys is used to ensure authenticity and by means of a table in the RAM storage in combination with the chip card, keys can be worked out, which are unique to the individual encryption and transfer of information.

Chip cards

From a cryptogical point of view, the explosive development of very small chips has facilitated a very interesting development, viz. the chip card. This card has the same shape and size as a magnetic card, but contains furthermore as mentioned above a small processor and a small storage (typically 1-2 kbyte), which may e.g. be of the type EEPROM (Electrically Eraseable Programmable Read Only Memory), so that both input and output access can be obtained via a card reader.

Such a card is particularly suitable for storage of e.g. a secret key. It is furthermore possible to protect this key efficiently by an encryption controlled by a PIN code, and by securing the key so that it cannot be read from the card, but only be used for encryption and decryption. It is also possible to let the card destroy itself (logically) if a wrong PIN code is used more than e.g. three times, and to give it a definite lifetime (a certain number of applications).

Detailed description of chip cards

Figure 3:
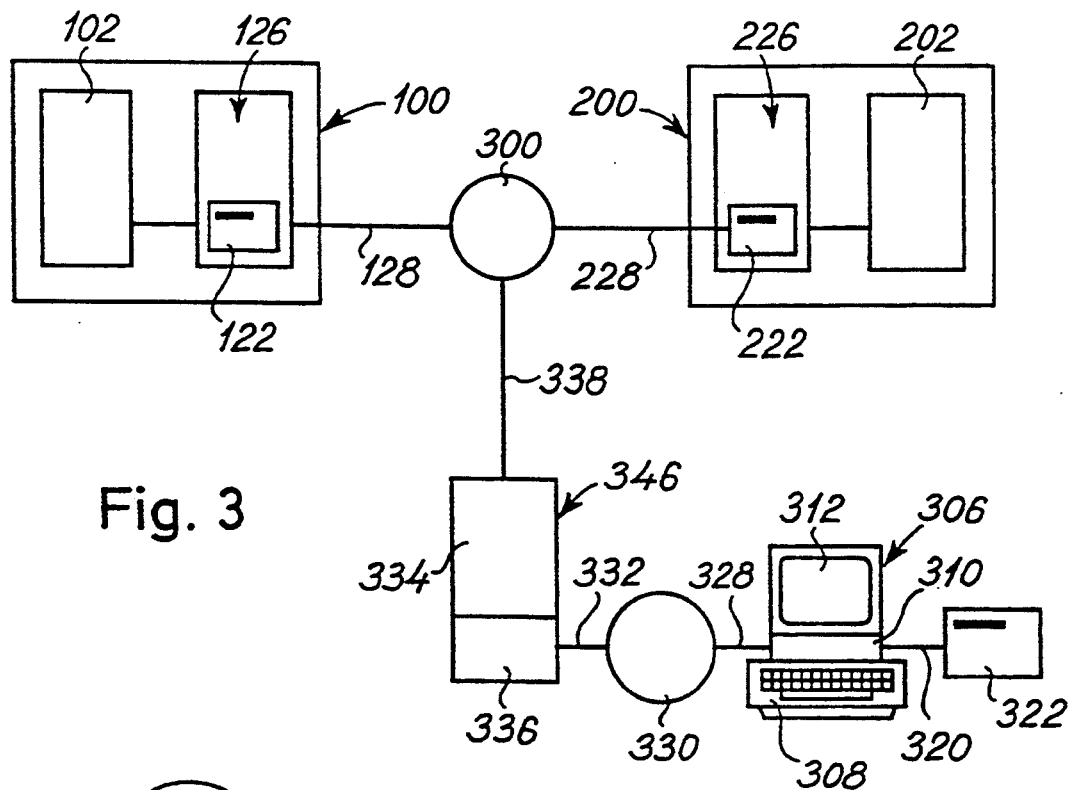

The chip card contains a micro processor, data and program storage and an I/O gate, secret information and protected information being hidden or stored in a data memory. As the I/O gate is controlled by the micro processor, all reading of information is controlled by the micro processor. Reading of secret data is not possible and reading of protected data is only possible after positive validation of the PIN code of the card. With correct PIN code it is possible to encrypt and decrypt data and to generate temporary keys. For encryption and decryption, the Data Encryption Standard (DES) is used. In addition to the operating system for the micro processor the program memory also contains the encryption algorithm DES. This has the result that the card can in fact be used to encrypt and decrypt data, even though it is quite a slow process (approx. 128 bytes per second).

The chip card in its present versions (DES Smart Card (Philips) and CP8 Smart Card (Bull)) can contain up to 1024 bytes information including various "headers". This corresponds to 500-800 bytes of user information, depending on the structure of the information in the card.

For different types of cards exist:

Batch card: this card is received together with the new cards and is used when personalizing these.

Root card: This card is used during the personalization to decrypt the application keys and the personal keys, before they are written into the chip card. This has the effect that the personal keys can be stored in a file in encrypted form and will only be known in the memory of the personalizing system during the execution of the personalization. The root card contains for each type of personal key a corresponding Root key.

Rehabilitation card: Is used when rehabilitating a Transaction card.

Transaction card: This is the card which is handed out to the users. It is used to store and protect personal keys and for generation of temporary keys for access control and encryption and decryption.

The lifetime of the chip card is divided into different phases:
1. Pre-personalization
2. Personalization
3. Active
4. End-of-life
5. Rehabilitation Re 1. Pre-personalization In this phase the card is empty apart from production information. The only information contained in the card at this time is a production key and information as to which "batch" the card belongs to. In order to obtain access to the memory of the card, it is necessary to know or gain access to the production key, which can only be obtained by having in one's possession the so-called Batch card which belongs to this particular "batch".

This ensures that only the holder of the Batch card can personalize cards and that the batch card holder only can personalize cards belonging to the "batch" in question.

Re 2. Personalization

When the production key is presented to the chip card, it is possible to input information into the memory. Information can e.g. be secret keys, DES identification, the names of the card holder and the card issuer, etc. When this phase is over, the card enters its active phase.

Re 3. Active

In this phase, the card is used by a user for encryption and decryption and for generating temporary keys.

The card can be used until one of three situations appear:

a) The card is invalidated by an end-of-life instruction.

b) One the control zones of the card is full. The card contains three special zones: production key control zone, application key control zone and PIN control zone. In the first two zones a bit will be placed when an error has been made when presenting a key. In the last zone a bit is placed, each time a check is made for the PIN code. If the last zone runs full, the card enters the end-of-life phase. This will happen after a maximum of 6000 presentations of the PIN code. The contents of this zone are reduced when user information and service keys are input into the card.

c) Three consecutive incorrect PIN code inputs cause the card to be locked. The card can be opened again by rehabilitation.

Re 4 End of life

In this phase, the card cannot be used. The card can be rehabilitated, if incorrect PIN code has been used.

Re 5. Rehabilitation

The card can be rehabilitated if the card holder still remembers the correct PIN code, otherwise not. Rehabilitation should be made by the card issuer and card holder jointly. In order to rehabilitate a chip card, a card is used which is specially designed for this purpose, viz. the rehabilitation card.

The design of the chip card provides a possibility of storing keys protected by PIN code, possibly encrypted and dedicated use of the keys (e.g. only decryption). At the same time the inputting of information and keys in a chip card depends on whether you have access to both the Root card and the Batch card, i.e. that only specific persons have access to input keys/information.

Administration of keys

One of the largest problems in connection with a crypto system of practical use is the actual handling of keys, as the keys are the "interface" of the system towards the users and constitute the weakest link of a system.

When a user is to have a key handed out or registered, it must be possible to identify him in a satisfactory way. The key is kept on a chip card, which can be allotted a definite lifetime, and which, as mentioned above, also destroys itself, when a wrong PIN code has been used three times.

The more a key is used, the greater the risk for the key becoming known. It is therefore necessary to change the key at frequent intervals. As the number of users becomes large, and arbitrary users must communicate with each other in encrypted form, the users are equipped with keys which are not used for data and file encryption, but only for exchange of the real encryption keys.

An administration is created around the security system and the handling of the keys, which a) ensures that the used keys are kept secret, b) ensures a possibility of being able to recreate used secret keys and provides a possibility of verifying that a certain key has been used for a specific purpose, c) gives a simple and safe allocation of keys, and d) prevents swindling with the allocation of chip cards by a stable and hermetic procedure.

The procedures for setting up the keys in connection with a chip card comprise:

1. Generation of keys
2. Inputting keys and desired information into chip cards
3. Distribution of cards
4. Renewal/withdrawal of cards Re 1. Generation of cards The keys for inputting information into the chip card are generated in such a way that they are both different and generated from random numbers. Accordingly, it is not possible to predict or guess the value of a key. In order to start the program for generating keys, a chip card must be presented (secured by a PIN code). The keys generated are stored in encrypted form in a file by means of this card.

Re 2. Inputting keys and desired information into the chip card

The data (keys and possible information) which are to be input into the cards, as provided by an application from the file in which they were arranged previously. The application sees to it that this data can only be transferred from the encrypted file to a chip card by two different persons with two different chip cards each having its own PIN code. The first card is a card which has been alloted to the card issuer and the contents of which are known exclusively by the manufacturer producing the "empty" chip cards. The second card is a card which follows the batch of cards being prepared. Accordingly, the person(s) generating the keys and the information has/have no possibility of inputting the keys and the information into the chip cards. On the other hand, the person(s) inputting the data into the chip cards has/have no possibility of learning what is being input into the cards. When the cards are being prepared, a logging to an encrypted file will be carried out. This file will be error tolerant and the mirror of an alternative physical position. The file will be secured by means of an appropriate security routine.

Re 3. Distribution of cards

Traditionally, the cards are issued to the users in batches. The card is sent separately and the PIN code is sent separately. The PIN code is sent or delivered after accept of receipt of the card.

Re 4. Renewal/withdrawal of cards

When a card has run out for one reason or another, it must be returned to the card issuer as far as possible. The card issuer destroys it and possibly issues a new card to replace the old card. For security reasons it is preferred that when changing cards, a new card is produced which is different in terms of the input keys from the card which has run out. If a user ceases to use the chip card, the card must be returned to the card issuer. Under all circumstances the card is blocked electronically. A possibility of blocking the card at the first presentation after the blocking can be input.

Observation of these precautions ensures that one person alone cannot produce a chip card, that only the card issuer can input information and keys, that keys can be produced at any time for verification of the use of a card which has run out and that the right user gets possession of the cards without any risk that the card is used by unauthorized persons.

Authenticity

The authenticity, i.e. security that the parties involved, transmitter/receiver are who they pretend to be, can be ensured in various ways, depending on whether the system is 1. a symmetrical system or
2. an asymmetrical system Re 1. Symmetrical crypto system In order to ensure that a transmitter (A) and a receiver (B) are who they pretend to be, A sends a number in encrypted form to B, and B verifies that the number comes from A. Then B sends a combination of a part of the number which B received from A, together with a number generated by B in encrypted form to A. A can hereafter verify that the combination has come from B, and at the same time A can check the part of the number which was generated by A. A now encrypts the number which A received from B and sends it back to B, who after verification can see that B has received the same combination as B sent to A. Below, it is outlined how a chip card can be used to ensure authenticity. When using the symmetrical crypto system a faint risk must be anticipated of a key being broken and data being read by third parties. This risk arises if a former member of the system with a thorough knowledge of the type of initial exchange of messages is in possession of a valid chip card and if this member taps the connection between transmitter and receiver and is in possession of the used crypto program.

Such a person will be able to decrypt the documents which are exchanged, encrypted with the described key in the transmission in question. However, it will not be possible to change the contents of the document and a renewed deciphering will also have to be made when tapping the next document transfer, as a new key is used for this transfer.

In the system according to the invention, a chip card reader 122, 222 and 426, respectively, is connected to each computer system or each host, the computer systems 100, 200 and 400.

The two computer systems constituting transmitter and receiver, the computer systems 100 and 200, respectively, shown in FIG. 1–4, are equipped with authorized chip cards and are authorized to use these.

Each card 122 and 222 has two service zones for this purpose:

A service zone with a "Verification key" (Vk) which is used to verify that the encryption which the opposite party has used is correct.

A service zone with a "Signature key" (Sk) which is used for encryption of the communication.

Vk can only be used for decryption and Sk can only be used for encryption.

Figure 5:
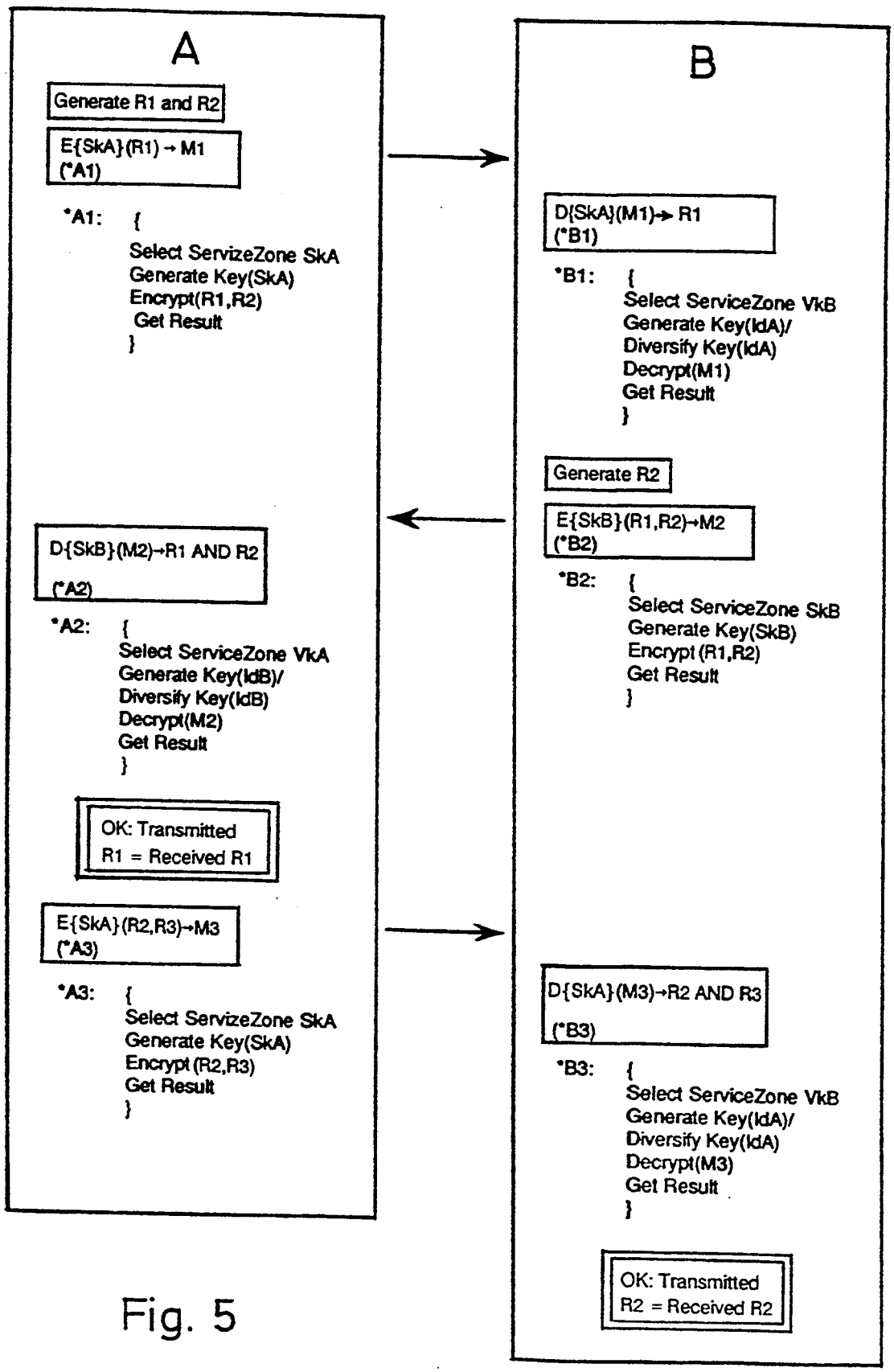

In the procedure shown in FIG. 5, the following abbreviations are used:

VkA: Verification key for A or the computer system 100
SkA: Signature key for A or the computer system 100
VkN: Verification key for B or the computer system 200
SkB: Signature key for B or the computer system 200
E: Encryption
D: Decryption
R1, R2, R2: Random numbers
M1, M2, M3: Transferred messages
IdA: The publicly known identification for A or the computer system 100
IdB: The publicly known identification for B or the computer system 200

The procedure appears from FIG. 5.

Re 2. Asymmetrical crypto system

The authenticity verification described above with reference to FIG. 5 is solely based on the application of an encryption system based on DES, but for the sake of completeness, the asymmetrical system is briefly described below.

If A or the computer 100 is to send a clear text M, which is to be kept secret when being transmitted, to B or the computer system 200, A uses B's public key PB which B has made public to everyone, and sends $$PB(M) \rightarrow C$$

Only B can decrypt, as only B knows his private key and $SB(C) \rightarrow M$.

If A is to send a clear text X to B in encrypted form in such a way that B can check that the message comes from A, A sends $$SA(X) \rightarrow Y.$$

B then tries with A's public key PA and finds $$PA(Y) \rightarrow X$$

If X is meaningful, then SA must have been used, as only A can encrypt in such a way that PA can decrypt into anything meaningful. It should be noted that authenticity is only ensured the first time the message X is signed. In practice therefore, such a message must be unique, e.g. by indicating the time of the day.

Both properties can be obtained in the following way:

If A wishes to send M to B, so that B is sure that the message comes from A at the same time ensuring that only B of all people can decrypt the message, A sends $$PB(SA(M) \rightarrow C.$$

The only way in which M can be deduced as follows:

$$PA(SB(C)) \rightarrow M$$

Integrity

The integrity ensures that data is not changed during or after a concluded transmission. This is ensured by calculating the transmitter's (A) signature and the receiver's (B) signature, adding these to the document and having both A and B verify these signatures. With the DES algorithm, signatures are produced which can be encrypted and verified by means of chip card:

In the system according to the invention, a chip card reader is connected to each computer system or each host. The two computer systems constituting transmitter and receiver, 100 and 200 respectively, shown in FIG. 1–4, are equipped with authorized chip cards and are authorized to use these.

For this purpose, each card has three service zones:

A service zone with a so-called "Verification key" (Vk), which is used for verifying the signature which the opposite party has added to the document.

A service zone with a "Signature key" (Sk) which is used to encrypt the signature.

A service zone with a "Compression key" (Ck) which is used to produce the signature (MAC).

Vk can only be used for decryption and Sk can only be used for encryption. Ck is identical in all chip cards and can be used for compacting the document to the signature.

Figure 6:
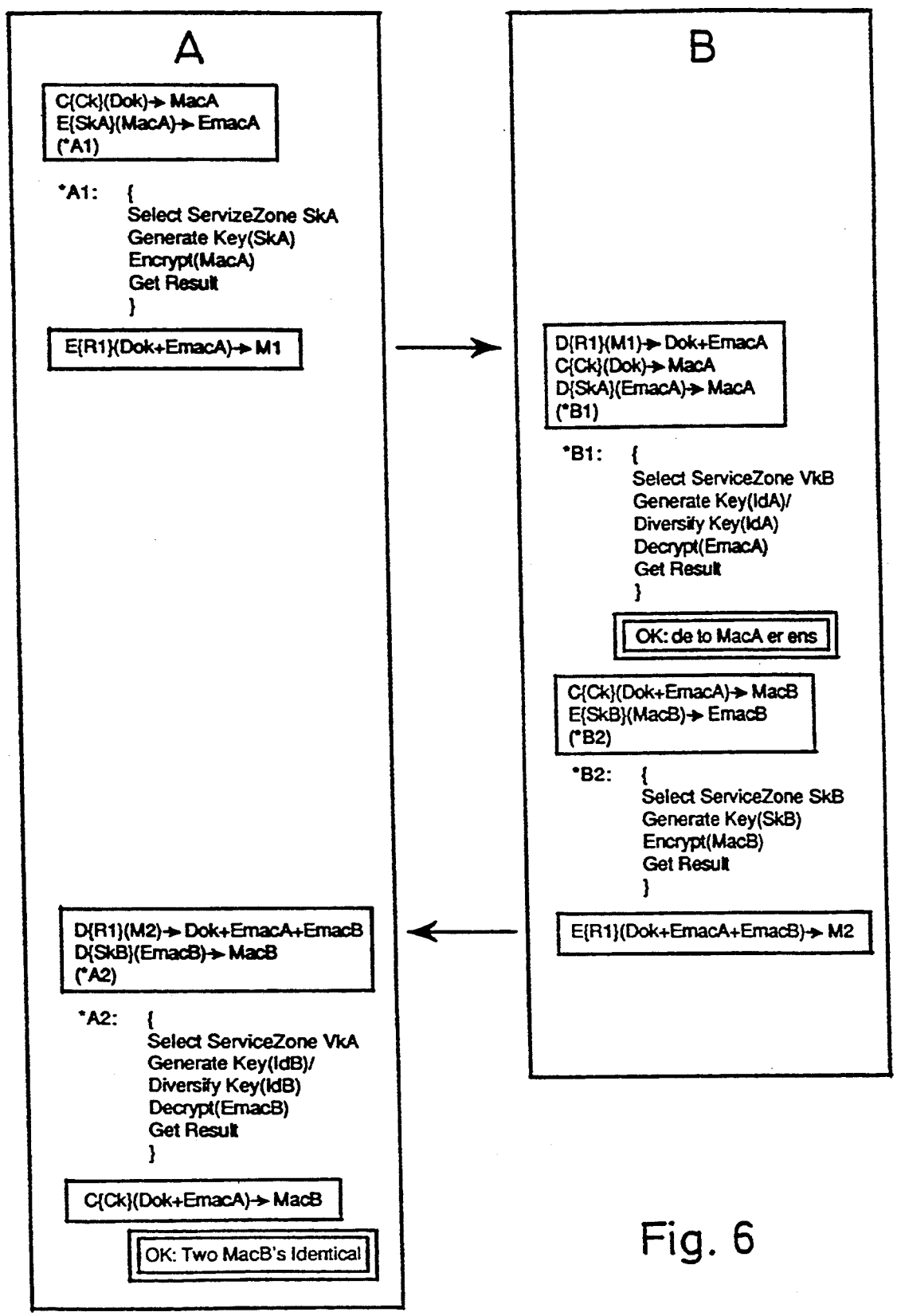

In the procedure shown in FIG. 6, the following abbreviations are used:

VkA: Verification key for A or the computer system 100
SkA: Signature key for A or the computer system 100
MacA: The compacted document seen from A's side
EmacA: The encrypted MacA
VkB: Verification key for B or the computer system 200
SkB: Signature key for B or the computer system 200
MacB: The compacted document seen from B's side
EmacB: The encrypted MacB
Ck: Compression key
E: Encryption
D: Decryption
C: Compression
R1: Random numbers exchanged previously
M1, M2, M3: Transferred messages
IdA: The publicly known identification for A
IdB: The publicly known identification for B The procedure appears from FIG. 6

The integrity is ensured as both transmitter and receiver are certain that (have a possibility of checking) that the document has not been changed before or after the transmission without possible changes being unambiguously ascertainable. The function *A2 is built up in such a way that the chip card can produce a key by means of a publicly known identification which can decrypt the encrypted B/Mac and thus provide a basis for checking that the Mac which is added to the document is valid, i.e. calculated on the basis of the document received by the expected transmitter. The same applies in the opposite direction to the function *B2.

It is important that the Mac's produced are hidden in the document, as they are the unique signatures of the parties.

Figure 4:
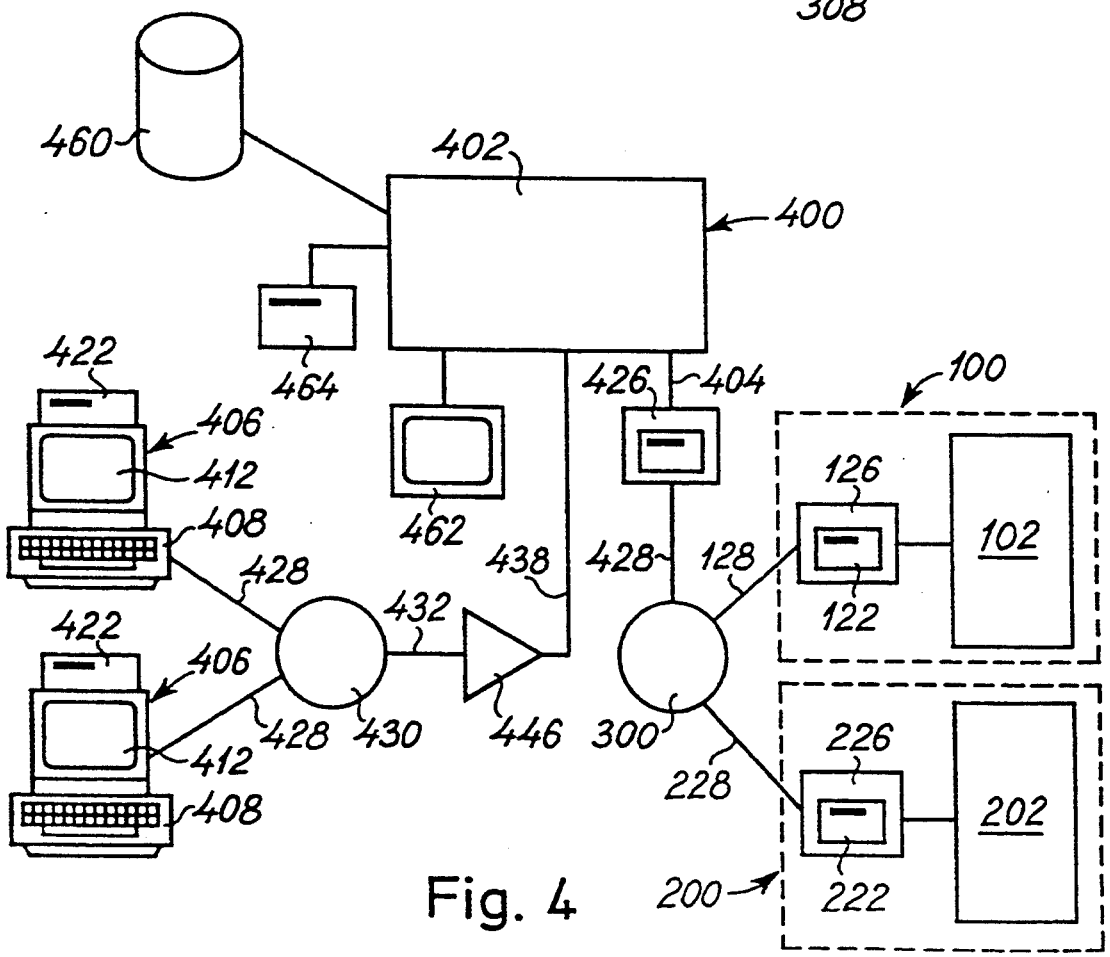

Security of access to the videostex system is shown in FIG. 4

This security is ensured by using chip cards for automatic log-on to the videotex system:

1. Automatic presentation of identification and password
2. Encryption of communication between terminal and videotex server 3. Security in the videotex server as regards the individual user's access to the individual mail boxes and the applications of the system.

Re 1. Automatic presentation of identification and password

A chip card reader 422 of the type LECAM connected to a Minitel 409 has an intelligence which has the effect that it reads in a certain position on the card searching for data for an automatized dialling. When the dialling has been made, the application which is running on the videotex system will transfer a program to the RAM storage of the chip card reader. This program will then find identification and password in the card, ask for the PIN code to be entered and communicate with the application on the videotex server. If the PIN code is stated incorrectly, the program has no possibility of collecting information in the chip card.

Re 2. Encryption of communication between terminal and videotex server

The program which is transferred to the chip card reader, finds the key which is to be used for encryption, by looking up the chip card. The videotex application looks up a table in the host or the computer system 400 and finds a corresponding key. Encryption is made on the basis of this key for the whole communication between Minitel 400 and Host 400. It is expedient to use this encryption key to encrypt the exchange of the randomly chosen key which is used for encryption of the rest of the communication, as this has the result that a different encryption key is used for each individual communication.

Re 3. Security in the videotex server as regards the individual user's access to the individual mail boxes and the applications of the system The access to mail boxes, data and applications in the videotex server is ensured by the "log-on" which is made on the basis of the information residing in the chip card. As the exchange of identification and password takes place in encrypted form, it will not be possible by tapping the line and the terminal to reconstruct these. In other words, it will not be possible to get in contact with the mail boxes without possessing a chip card with a secret PIN code (which is only found in the card).

After access has been obtained to the video tex system, it is secured that access cannot be obtained to a basic host computer. This is done to avoid that data hackers by an error in the video tex system can obtain access to the operating system of the host computer.

Security when exchanging documents

The security system sees to it that documents which are built up according to the EDIFACT standard can be transferred securely between connected hosts.

It is ensured
1. that the documents can be endorsed with signature,
2. that the documents cannot be forged,
3. that the documents can only be read by/transferred to the person authorized, and
4. that it is possible to produce unambiguous evidence in connection with a possible dispute Re 1. The documents can be endorsed with a signature The transmitter goes through the document or parts thereof in order to generate an abbreviated expression of the document (e.g. a 64 bit key). This expression contains at least a serial number, date, time and all the sensitive data. This expression is encrypted by a chip card with a key which is found in the card and which cannot be read but only used for encryption or decryption in the card. The encrypted result (MAC - Message Authentification Code) is unique to this document and this transmitter, and the MAC is added to the document, whereupon it is ready for "dispatch".

Re 2. The documents cannot be forged

If changes are made in the document after the transfer is considered to be concluded, it will be possible to ascertain this, as the MAC's which are included in the document can be validated, whereupon the document is accepted or considered as invalid.

Re 3. The documents can only be read by/transferred to the authorized person

Both transmitter and receiver make sure that they are in contact with the right person, whereupon the document is encrypted by means of a key which is known by transmitter and receiver exclusively and which is arbitrary and only applies to this one transfer.

Re 4. Possibility of producing unambiguous evidence in connection with a possible dispute (MAC)

This is ensured by the card issuer's keeping the issued keys in a satisfactory way so that it can be decided at any time whether there is identity between a document and the associated MAC's.

EDIFACT definition

EDIFACT (Electronic Data Interchange For Administration, Commerce and Transport) is a standardised method of electronic transfer of all business related documents, which have an organized structure. The standard—which is approved by ISO (International Standard Organization)—is meant for exchange of documents between computer systems on both a domestic and a foreign level; the standard is therefore not dependent on language. The standard does not prescribe how the actual network communication must be carried out; it is a technically independent standard.

An EDIFACT document can be divided into certain parts or modules, which are called segments. Each segment has a specific purpose in the document in question, and the position of the segment in the message is prescribed by the standard for the document type in question. All segments are identified by a 3-letter code as prescribed by the standard. A message consists of many different segments which together contain all the information which is necessary to create the document.

A segment may e.g. look like this:

CUX+DEM:IN'

CUX is a segment head; CUX means type of currency
+ is data element punctuation mark
DEM means German marks—the value can be anything else; arbitrarily definable as long as both transmitter and receiver agree to the meaning of the codes
: is a data component punctuation mark
IN is an abbreviation of INvoice—also arbitrarily definable
' designates the end of a segment The contents of a segment can be divided into data elements. A data element is divided into one or more data components. In the above example with the segment CUX, only one data element is found. This data element consists of 2 data components, viz DEM and IN.

: is the punctuation mark separating coherent data components, whereas + is the separator for the individual data elements in a segment. This technique of describing information in a document is general and is used in all EDIFACT segments.

The data which follows a given segment head, is defined in the standard and is therefore unalterable. It is, however, not all data which is compulsory—quite a few can be omitted depending on the need.

To a very large extent, codes are used in the individual segments. By this is meant e.g. DEM in the above example which means German marks.

Both parties to the communication (transmitter and receiver) must agree to the application of these, as these are not covered by the standard.

We claim:

1. A method of transferring data from a first computer system to a second computer system via a data transmission line by use of a coherent set of electronic cards, wherein for said transfer a first station is used for outputting data from and inputting data into a first electronic card, said first station being connected to and communicating with said first computer system and furthermore being connected to said data transmission line via said first computer system and interfacing means, and a second station is used for outputting data from and inputting data into a second electronic card, said second station being connected to and communicating with said second computer system and furthermore being connected to said data transmission line via this second computer system and interfacing means, said first and second electronic card each comprising a central data processing unit, an internal storage means, an input/output gate for communication with said corresponding station as well as an encryption/decryption means and together constituting the coherent set of electronic cards comprising coherent encryption and decryption keys input into said internal storages of said cards in such a way that the cards are able to communicate with each other and encrypt and decrypt data transferred from the first card to the second card and vice versa, said method comprising the steps of:

transferring said data to said first electronic card from said first computer system via said first station and said input/output gate of said first electronic card, and inputting and temporarily storing said data in said internal storage of said first electronic card, outputting said data from said internal storage of said first electronic card and encrypting said data in said first electronic card by means of said encryption/decryption means of said first electronic card and said encryption key(s) stored in said internal storage of said first electronic card, outputting said data from said first electronic card in encrypted form via said input/output gate of said first electronic card and transferring said encrypted data via said first station to said first computer system and therefrom via said interfacing means of said first computer system to said data transmission line, receiving said data by said second computer system in encrypted form via said interfacing means of said second computer system, transferring said encrypted data to said second electronic card via said second station and via said input/output gate of said second electronic card, and inputting and temporarily storing said data in said internal storage of said second electronic card, outputting said data from said internal storage of said second electronic card in encrypted form and decrypting said data in said second electronic card by means of said encryption/decryption means of said second electronic card and said decryption key(s) stored in said internal storage of said second electronic card, and outputting said data from said second electronic card in encrypted form via said input/output gate of said second electronic card and via said second station to said second computer system.

2. A method according to claim 1, further comprising the steps of making a verification of the authenticity of said first electronic card relative to said second electronic card and vice versa prior to said transfer of said data from said first computer system to said second computer system.

3. A method according to claim 1, further comprising the step of making a verification of the integrity of said data at said transfer of said data from said first computer system to said second computer system.

4. A method according to claim 1, wherein said inputting into, said outputting from, said encryption and said decryption and possibly said authenticity and integrity verification is controlled autonomously by said central data processing unit of said individual card.

5. A method according to claim 4, wherein said transfer of said data is made in accordance with the LECAM protocol.

6. A method according to claim 2, said authenticity verification comprising the steps of:

generating a first set of data in said first electronic card, inputting and storing said first set of data in said internal storage of said first electronic card, and encrypting said first set of data in said first electronic card by means of said encryption/decryption means of said first electronic card and said encryption key(s) stored in said internal storage of said first electronic card, outputting said first set of data from said first electronic card in encrypted form via said input/output gate of said first electronic card, transferring said first set of data via said first station to said first computer system and therefrom via said interfacing means of said first computer system to said data transmission line, receiving said first set of data by said second computer system in encrypted form via said interfacing means of said second computer system, transferring said encrypted first set of data to said second electronic card via said second station and via said input/output gate of said second electronic card, and inputting and temporarily storing said encrypted first set of data in said internal storage of said second electronic card, outputting said first set of data received by said second computer system in encrypted form from said internal storage of said second electronic card, and decrypting said encrypted first set of data in said second electronic card by means of said encryption/decryption means of said second electronic card and said decryption key(s) stored in said internal storage of said second electronic card, inputting and storing, in said internal storage of said second electronic card, said first set of data received by said second computer system in encrypted form and decrypted in said second electronic card, generating a second set of data in said second electronic card, and inputting and storing said second set of data in said internal storage of said second electronic card, generating, in said second electronic card, a first combination of said first set of data received by said second computer system in encrypted form, decrypted and stored in said internal storage of said second electronic card and said second set of data stored in said internal storage of said second electronic card, and inputting and storing said first combination in said internal storage of said second electronic card, encrypting said first combination in said second electronic card by means of said encryption/decryption means of said second electronic card and said encryption key(s) stored in said internal storage of said second electronic card, outputting said first combination from said second electronic card in encrypted form via said input-/output gate of said second electronic card, and transferring said encrypted first combination via said second station to said second computer system and therefrom via said interfacing means of said second computer system to said data transmission line, receiving said first combination by said first computer system in encrypted form via said interfacing means of said first computer system, transferring said encrypted first combination to said first electronic card via said first station and via said input-/output gate of said first electronic card, and inputting and temporarily storing said encrypted first combination in said internal storage of said first electronic card, outputting, from said internal storage of said first electronic card, said first combination received by said first computer system in encrypted form, and decrypting said encrypted first combination in said first electronic card by means of encryption/decryption means of said first electronic card and said decryption key(s) stored in said internal storage of said first electronic card, inputting and storing, in said internal storage of said first electronic card, said first combination received by said first computer system in encrypted form and decrypted in said first electronic card, decombining said first combination stored in said internal storage of said first electronic card for producing a first set of data retransmitted to said first electronic card and a second set of data transferred to said first electronic card, inputting and storing, in said internal storage of said first electronic card, said first set of data retransmitted to said first electronic card and said second set of data transferred to said first electronic card, comparing said first set of data stored in said internal storage of said first electronic card to said first set of data retransmitted to said first electronic card and stored in said internal storage of said first electronic card for verification of identity between these sets of data for verification of the authenticity of said second electronic card relative to said first electronic card, generating a third set of data in said first electronic card, inputting and storing said third set of data in said internal storage of said first electronic card, generating, in said first electronic card, a second combination of said second set of data received in encrypted form by said first computer system, decrypted and stored in said internal storage of said first electronic card and said third set of data stored in said internal storage of said first electronic card, and inputting and storing said second combination in said internal storage of said first electronic card, encrypting said second combination in said first electronic card by means of said encryption/decryption means of said first electronic card and said encryption key(s) stored in said internal storage of said first electronic card, outputting said second combination from said first electronic card in encrypted form via said input-/output gate of said first electronic card, and transferring said second combination via said first station to said first computer system and therefrom via said interfacing means of said first computer system to said data transmission line, receiving said second combination by said second computer system in encrypted form via said interfacing means of said second computer system, transferring said encrypted second combination to said second electronic card via said second station and via said input/output gate of said second electronic card, and inputting and temporarily storing said encrypted second combination in said internal storage of said second electronic card, outputting, from said internal storage of said second electronic card, said second combination received by said second computer system in encrypted form, and decrypting said encrypted second combination in said second electronic card by means of said encryption/decryption means of said second electronic card and said decryption key(s) stored in said internal storage of said second electronic card, inputting and storing, in said internal storage of said second electronic card, said second combination received by said second computer system in encrypted form and decrypted, decombining said second combination stored in said internal storage of said second electronic card for producing a second set of data retransmitted to said second electronic card and a third set of data transferred to said second electronic card, inputting and storing, in said internal storage of said second electronic card, said second set of data retransmitted to said second electronic card and said third set of data transferred to said second electronic card, and comparing said second set of data stored in said internal storage of said second electronic card to said second set of data retransmitted to said second electronic card and stored in said internal storage of said second electronic card for verification of identity between these sets of data for verification of the authenticity of said first electronic card relative to said second electronic card.

7. A method according to claim 3, said integrity verification comprising the steps of:

generating a compacted version of said data in said first computer system or said first electronic card, and inputting and storing said compacted version in said internal storage of said first electronic card, generating, in said second computer system or in said second electronic card, a compacted version of said data transferred to said second computer system, and inputting and storing said compacted version in said internal storage of said second electronic card, outputting, from said internal storage of said first electronic card, said compacted data version stored in said internal storage of said first electronic card, and encrypting said compacted data version in said first electronic card by means of said encryption/decryption means of said first electronic card and said encryption key(s) stored in said internal storage of said first electronic card, outputting, from said first electronic card via said input/output gate of said first electronic card, said compacted data version encrypted by said encryption/decryption means of said first electronic card, and transferring said encrypted and compacted data version via said first station to said first computer system and therefrom via said interfacing means of said first computer system to said data transmission line, receiving, by said second computer system via said interfacing means of said second computer system, said encrypted and compacted data version transferred from said first computer system, transferring said encrypted and compacted data version to said second electronic card via said second station and via said input/output gate of said second electronic card, and inputting and temporarily storing said encrypted and compacted data version in said internal storage of said second electronic card, outputting, from said internal storage of said second electronic card, said compacted data version received by said second computer system in encrypted form, and decrypting said compacted data version in said second electronic card by means of said encryption/decryption means of said second electronic card and said decryption key(s) stored in said internal storage of said second electronic card, inputting and storing, in said internal storage of said second electronic card, said decrypted, compacted data version received by said second computer system in encrypted form and decrypted by said second electronic card, and comparing, in said second electronic card for verification of the integrity of or identity between said data transferred from said first computer system and said data received by said second computer system, said compacted data version stored in said second electronic card to said decrypted, compacted data version received by said second computer system in encrypted form and decrypted in said second electronic card.

8. A method according to claim 3, said integrity verification comprising the steps of:

generating a compacted version of said data in said first computer system or in said first electronic card, and inputting and storing said compacted version in said internal storage of said first electronic card, generating, in said second computer system or in said second electronic card, a compacted version of said data transferred to said second computer system, and inputting and storing said compacted version in said internal storage of said second electronic card, outputting, from said internal storage of said second electronic card, said compacted version stored in said internal storage of said second electronic card, and encrypting said compacted version in said second electronic card by means of said encryption/decryption means of said second electronic card and said encryption key(s) stored in said internal storage of said second electronic card, outputting, from said second electronic card via said input/output gate of said second electronic card, said compacted data version encrypted by said encryption/decryption means of said second electronic card, and transferring said encrypted and compacted data version via said second station to said second computer system and therefrom via said interfacing means of said second computer system to said data transmission line, receiving, by said first computer system via said interfacing means of said first computer system, said encrypted and compacted data version transferred from said second computer system, transferring said encrypted and compacted data version to said first electronic card via said first station and via said input/output gate of said first electronic card, and inputting and temporarily storing said encrypted and compacted data version in said internal storage of said first electronic card, outputting, from said internal storage of said first electronic card, said compacted data version received by said first computer system in encrypted form, and decrypting said encrypted and compacted data version in said first electronic card by means of said encryption/decryption means of said first electronic card and said decryption key(s) stored in said internal storage of said first electronic card, inputting and storing, in said internal storage of said first electronic card, said decrypted, compacted data version received by said first computer system in encrypted form and decrypted by said first electronic card, and comparing, in said first electronic card for verification of the integrity of or identity between said data transferred from said first computer system and said data received by said second computer system, said compacted data version stored in said first electronic card to said decrypted, compacted data version received by said first computer system in encrypted form and decrypted in said first electronic card.

9. A method according to claim 7, wherein said transfer of said compacted data version generated in said first computer system or in said first electronic card from said first electronic card to said second electronic card is made simultaneously with said transfer of said data itself, and said data and said compacted data version are combined and encrypted as a whole before said transfer.

10. A method according to claim 8, wherein said transfer of said compacted data version generated in said second computer system or in said second electronic card from said second electronic card to said first electronic card is made simultaneously with a retransmission of said data received from said first electronic card from said second electronic card to said first electronic card, and said data to be retransmitted and said compacted data version are combined and encrypted as a whole before said transfer.

11. A method according to claim 8, wherein
said transfer of said compacted data version generated in said second computer system or in said second electronic card from said second electronic card to said first electronic card is made simultaneously with a retransmission of said compacted data version received by said second electronic card from said second electronic card to said first electronic card, said transfer and retransmission of compacted data versions are made simultaneously with a retransmission of said data received by said second electronic card from said second electronic card to said first electronic card, and said data to be retransmitted and both compacted data versions are combined and encrypted as a whole before said transfer.

12. A system for said transfer of data from a first computer system to a second computer system, which second computer system is autonomous in relation to said first computer system via a data transmission line, according to the method of claim 1, said system comprising a first station and a second station, which are connected to and communicate with said first and said second computer system, respectively, and which furthermore via said first and said second computer system, respectively, and corresponding interfacing means are connected to said data transmission line, as well as a first and a second electronic card, which constitute a coherent set of cards comprising coherent encryption/-decryption keys input into said internal storages of said cards in such a way that the cards are able to communicate with each other and encrypt and decrypt data transferred from the first card to the second card and vice versa.

13. A system according to claim 12, said first and said second electronic card being of the type DES Smart Card (Philips), Super Smart Card (Bull) or CP8 Smart Card (Bull).

14. A method according to claim 2, further comprising the step of making a verification of the integrity of said data at said transfer of said data from said first computer system to said second computer system.

15. A method according to claim 6, wherein
the encryption key used for encrypting the first set of data and the second combination is made by use of a first signature key stored in the first electronic card,
the decryption key used for decrypting the encrypted form of the first set of data and the encrypted form of the second combination is made by use of a second verification key stored in the second electronic card and a publicly known identification of the first electronic card,
the encryption key used for encrypting the first combination is made by use of a second signature key stored in the second electronic card, and
the decryption key used for decrypting the encrypted form of the first combination is made by use of a first verification key stored in the first electronic card and a publicly known identification of the second electronic card.

16. A method according to claim 1, wherein the encryption and decryption keys used for encrypting and decrypting the transferred data are generated from a first set of data generated in an authenticity verification which is made prior to the transfer of the data as described in claim 6.

17. A method according to claim 16, wherein the authenticity verification further comprises the method of claim 16.

18. A method according to claim 7, wherein the integrity verification further comprises the steps of:
outputting, from said internal storage of said second electronic card, said compacted version stored in said internal storage of said second electronic card, and encrypting said compacted version in said second electronic card by means of said encryption/decryption means of said second electronic card and said encryption key(s) stored in said internal storage of said second electronic card,
outputting, from said second electronic card via said input/output gate of said second electronic card, said compacted data version encrypted by said encryption/decryption means of said second electronic card, and transferring said encrypted and compacted data version via said second station to said second computer system and therefrom via said interfacing means of said second computer system to said data transmission line,
receiving, by said first computer system via said interfacing means of said first computer system, said encrypted and compacted data version transferred from said second computer system, transferring said encrypted and compacted data version to said first electronic card via said first station and via said input/output gate of said first electronic card, and inputting and temporarily storing said encrypted and compacted data version in said internal storage of said first electronic card,
outputting, from said internal storage of said first electronic card, said compacted data version received by said first computer system in encrypted form, and decrypting said encrypted and compacted data version in said first electronic card by means of said encryption/decryption means of said first electronic card and said decryption key(s) stored in said internal storage of said first electronic card,
inputting and storing, in said internal storage of said first electronic card, said decrypted, compacted data version received by said first computer system in encrypted form and decrypted by said first electronic card, and
comparing, in said first electronic card for verification of the integrity of or identity between said data transferred from said first computer system and said data received by said second computer system, said compacted data version stored in said first electronic card to said decrypted, compacted data version received by said first computer system in encrypted form and decrypted in said first electronic card.

19. A method according to claim 9, wherein the compacted data is generated by use of a common compression key prestored in the electronic cards.

20. A method according to claim 9, wherein
the compacted data version is encrypted by use of a first signature key, which is stored in the first electronic card, before being combined with the data and further encrypted as a whole, and
the encrypted compacted data version is decrypted by use of a second verification key stored in the second electronic card and a publicly known identification of the first electronic card after the combination of the data and the compacted data version has been transferred and decrypted as a whole.

21. A method according to claim 9, wherein the encryption and decryption keys used for encrypting and decrypting the combination of the data and the compacted data version are generated from a first set of data generated in an authenticity verification which is made prior to the transfer of the data as described in claim 6.

22. A method according to claim 21, wherein the authenticity verification further comprises the method of claim 15.

23. A method according to claim 10, wherein the compacted data is generated by use of a common compression key prestored in the electronic cards.

24. A method according to claim 10, wherein
the compacted data version is encrypted by use of a second signature key, which is stored in the second electronic card, before being combined with the data to be retransmitted and further encrypted as a whole, and
the encrypted compacted data is decrypted by use of a first verification key stored in the first electronic card and a publicly known identification of the second electronic card after the combination of the data to be retransmitted and the compacted data version has been transferred and decrypted as a whole.

25. A method according to claim 10, wherein the encryption and decryption keys used for encrypting and decrypting the combination of the data to be retransmitted and the compacted data version are generated from a first set of data generated in an authenticity verification which is made prior to the transfer of the data as described in claim 6.

26. A method according to claim 25, wherein the authenticity verification further comprises the method of claim 15.

27. A method according to claim 7, wherein the compacted data is generated by use of a common compression key prestored in the electronic cards.

28. A method according to claim 8, wherein the compacted data is generated by use of a common compression key prestored in the electronic cards.

29. A method according to claim 18, wherein
said transfer of said compacted data version generated in said first computer system or in said first electronic card from said first electronic card to said second electronic card being made simultaneously with said transfer of said data itself, said data and said compacted data version being combined and encrypted as a whole before said transfer,
said transfer of said compacted data version generated in said second computer system or in said second electronic card from said second electronic card to said first electronic card being made simultaneously with a retransmission of said compacted data version received by said second electronic card from said second electronic card to said first electronic card, said transfer and retransmission of said compacted data versions also being made simultaneously with a retransmission of said data received by said second electronic card from said second electronic card to said first electronic card, said data to be retransmitted and both compacted data versions being combined and encrypted as a whole before said transfer.

30. A method according to claim 29, wherein the compacted data is generated by use of a common compression key prestored in the electronic cards.

31. A method according to claim 2, wherein
the encryption key(s) stored in the internal storage of the first electronic card include(s) a first encryption key made by use of a first signature key stored in the first electronic card,
the decryption key(s) stored in the internal storage of the second electronic card include(s) a second decryption key made by use of a second verification key stored in the second electronic card and a publicly known identification of the first electronic card,
the encryption key(s) stored in the internal storage of the second electronic card include(s) a second encryption key made by use of a second signature key stored in the second electronic card,
the decryption key(s) stored in the internal storage of the first electronic card include(s) a first decryption key made by use of a first verification key stored in the first electronic card and a publicly known identification of the second electronic card, and
the authenticity verification comprises the steps of:
a) generating a first random number in the transmitter,
b) encrypting the first random number by use of the first encryption key to obtain a first authenticity message within the first electronic card,
c) transmitting the first authenticity message to the second electronic card,
d) decrypting the first authenticity message within the second electronic card by use of the second decryption key to obtain the first random number within the second electronic card,
e) generating a second random number in the receiver,
f) combining the received first random number with the second random number to obtain a first combination within the second electronic card,
g) encrypting the first combination by use of the second encryption key to obtain a second authenticity message within the second electronic card,
h) transmitting the second authenticity message to the first electronic card,
i) decrypting the second authenticity message within the first electronic card by use of the first decryption key to obtain the first combination within the first electronic card,
j) separating the received first combination within the first electronic card,
k) comparing the value of the first random number generated in the transmitter with the value of the first random number received from the second electronic card and stored in the first electronic card, and in case the two values are equal verifying the authenticity of the identity of the second electronic card,
l) generating a third random number within the transmitter,
m) combining the received second random number with the third random number to obtain a second combination within the first electronic card,
n) encrypting the second combination by use of the first encryption key to obtain a third authenticity message within the first electronic card,
o) transmitting the third authenticity message to the second electronic card,
p) decrypting the third authenticity message within the second electronic card by use of the second decryption key to obtain the second combination within the second electronic card, q) separating the received second combination within the second electronic card, r) comparing the value of the second random number generated in the receiver with the value of the second random number received from the first electronic card and stored in the second electronic card, and in case the two values are equal verifying the authenticity of the identity of the first electronic card.

32. A method according to claim 3, wherein the encryption key(s) stored in the internal storage of the first electronic card include(s) a first encryption key made by use of a first signature key stored in the first electronic card, the decryption key(s) stored in the internal storage of the second electronic card include(s) a second decryption key made by use of a second verification key stored in the second electronic card and a publicly known identification of the first electronic card, the encryption key(s) stored in the internal storage of the second electronic card include(s) a second encryption key made by use of a second signature key stored in the second electronic card, the decryption key(s) stored in the internal storage of the first electronic card include(s) a first decryption key made by use of a first verification key stored in the first electronic card and a publicly known identification of the second electronic card, a common compression key is stored in the internal storage of the first electronic card and in the internal storage of the second electronic card, the encryption key(s) stored in the internal storage of the first electronic card and in the internal storage of the second electronic card include(s) a random encryption key made by use of a previously exchanged random number, the decryption key(s) stored in the internal storage of the second electronic card and in the internal storage of the second electronic card include(s) a random decryption key made by use of a previously exchanged random number, and the integrity verification comprises the steps of:

a) generating a first compacted document of the data within the transmitter by use of the common compression key, b) encrypting the first compacted document by use of the first encryption key to obtain an encrypted first compacted document within the first electronic card, c) combining the data and the encrypted first compacted document to a first combination and encrypting this first combination by use of the random encryption key to obtain a first integrity message within the first electronic card, d) transmitting the first integrity message to the second electronic card, e) decrypting the first integrity message within the second electronic card by use of the random decryption key to obtain the first combination within the second electronic card, f) separating the first combination within the second electronic card, g) generating within the receiver a second version of the first compacted document of the received data by use of the common compression key, h) decrypting the received encrypted first compacted document within the second electronic card by use of the second decryption key to obtain a first version of the first compacted document, i) comparing the obtained results of the first and second version of the first compacted document, and in case the two versions are equal verifying the integrity of the transmission of the data from the first electronic card to the second electronic card, j) generating within the receiver a second compacted document of the first combination by use of the common compression key, k) encrypting the second compacted document by use of the second encryption key to obtain an encrypted second compacted document within the second electronic card, l) combining the first combination and the encrypted second compacted document to a second combination and encrypting this second combination by use of the random encryption key to obtain a second integrity message within the second electronic card, m) transmitting the second integrity message to the first electronic card, n) decrypting the second integrity message within the first electronic card by use of the random decryption key to obtain the second combination within the first electronic card, o) separating the second combination within the first electronic card, p) generating within the transmitter a second version of the second compacted document of the received second combination by use of the common compression key, q) decrypting the received encrypted second compacted document within the first electronic card by use of the first decryption key to obtain a first version of the second compacted document, r) comparing the obtained results of the first and second versions of the second compacted document, and in case the two versions are equal verifying the integrity of the transmission of the data from the first electronic card to the second electronic card.

33. A method according to claim 32, wherein the previously exchanged random number has been exchanged in an authenticity verification as described in claim 31.

* * * * *

UNITED STATES PATENT AND TRADEMARK OFFICE
CERTIFICATE OF CORRECTION

PATENT NO. : 5,311,595
DATED : May 10, 1994
INVENTOR(S) : Bjerrum et al.

It is certified that error appears in the above-identified patent and that said Letters Patent is hereby corrected as shown below:

On the title page: Item [75] Inventors:

delete "Nielsen Kjaer" and insert --Sven Kjaer Nielsen--.

In column 12, line 1, delete "entirely" and insert --entirety--.

In column 21, line 11, delete "cryptogical" and insert --cryptological--.

In column 26, line 61, delete "videostex" and insert --videotex--.

Signed and Sealed this

Thirtieth Day of April, 1996

Attest:

BRUCE LEHMAN

*Attesting Officer*                *Commissioner of Patents and Trademarks*